United States Patent [19]
Wasilewski et al.

[11] Patent Number: 5,319,707
[45] Date of Patent: Jun. 7, 1994

[54] SYSTEM AND METHOD FOR MULTIPLEXING A PLURALITY OF DIGITAL PROGRAM SERVICES FOR TRANSMISSION TO REMOTE LOCATIONS

[75] Inventors: Anthony J. Wasilewski, Alpharetta; Julius B. Bagley, Marietta, both of Ga.

[73] Assignee: Scientific Atlanta, Atlanta, Ga.

[21] Appl. No.: 970,918

[22] Filed: Nov. 2, 1992

[51] Int. Cl.$^5$ .................................... H04N 7/167
[52] U.S. Cl. .................................. 380/14; 380/10
[58] Field of Search ............... 380/10, 14, 13, 15, 380/19

[56] References Cited

U.S. PATENT DOCUMENTS

| | | | |
|---|---|---|---|
| 4,587,514 | 5/1986 | Schas et al. | 370/95 |
| 4,742,543 | 5/1988 | Frederiksen | 380/9 |
| 4,787,085 | 11/1988 | Suto et al. | 370/110.1 |
| 4,829,569 | 5/1989 | Seth-Smith et al. | 380/10 |
| 4,857,799 | 8/1989 | Spindt et al. | |
| 4,866,770 | 9/1989 | Seth-Smith et al. | 380/20 |
| 4,994,909 | 2/1991 | Graves et al. | 380/14 |
| 5,091,936 | 2/1992 | Katznelson et al. | 380/19 |

OTHER PUBLICATIONS

Japanese Patent Application Laying Open (KOKAI) No. 62-172631, laid open on Jul. 29, 1987.

*Primary Examiner*—David C. Cain
*Attorney, Agent, or Firm*—Woodcock Washburn Kurtz Mackiewicz & Norris

[57] ABSTRACT

A system and method for multiplexing a plurality of digital programs for transmission to a plurality of remote locations is claimed. An encoder is provided that first generates a plurality of subframe data streams each comprising a continuous sequence of subframes. Each subframe in each subframe data stream comprises at least a transport layer region and a program data region. For each subframe data stream, portions of the program data region of each of the subframes in that subframe data stream are allocated to selected ones of the plurality of programs. Mapping information is provided in the transport layer region of each subframe for use by a decoder in extracting a selected program from each subframe. A multiplex data stream is then generated at the encoder that comprises a continuous sequence of superframes. Each superframe comprises a superframe transport layer region and a subframe data region. A portion of the subframe data region of each superframe is allocated to at least one subframe from each of the plurality of subframe data streams. A superframe map is then generated and transmitted with each superframe that specifies at least the location of each subframe within the superframe. The multiplex data stream is then transmitted to the plurality of remote locations. According to one embodiment, at an intermediate location, subframe data streams may be extracted from one multiplex data stream for re-routing within other multiplex data streams.

55 Claims, 16 Drawing Sheets

SUPERFRAME ID

| TRANSMITTER ID | SUPERFRAME TRANSPORT BLOCK COUNT | REED-SOLOMON T-STRENGTH NUMBER | SPARE |
|---|---|---|---|
| 12 | 5 | 16 | 63 |

96, 98, 100, 84

PROGRAM DATA PACKET (60 BITS)

| $P_1$ | $P_2$ | $P_3$ | $P_4$ |
|---|---|---|---|
| 20 BITS | 20 BITS | 10 BITS | 10 BITS |

122

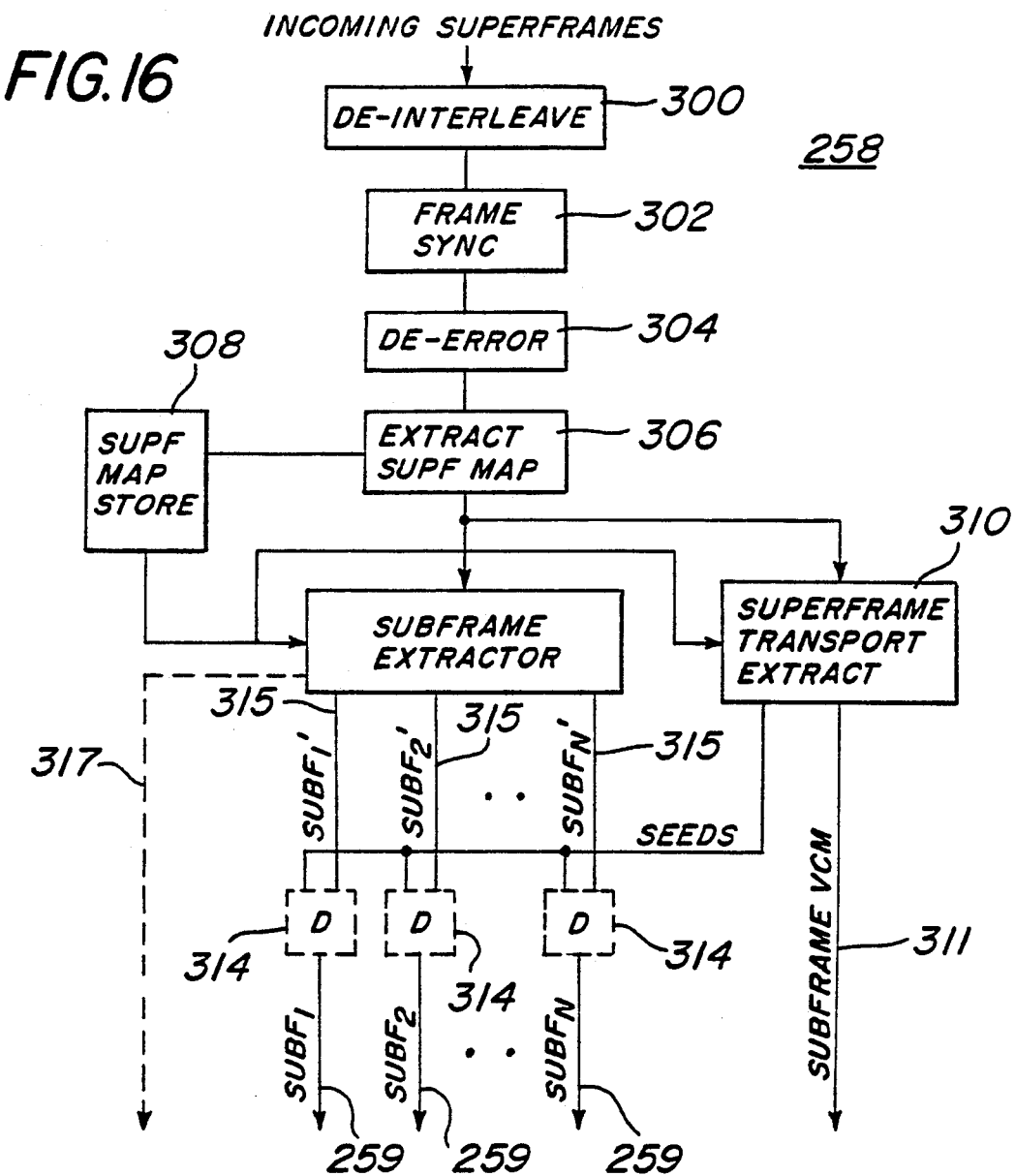
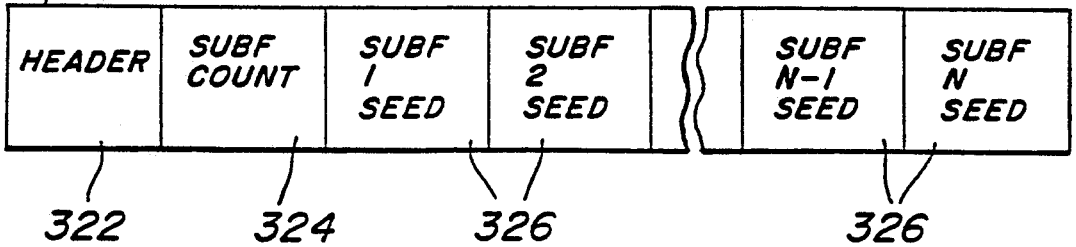

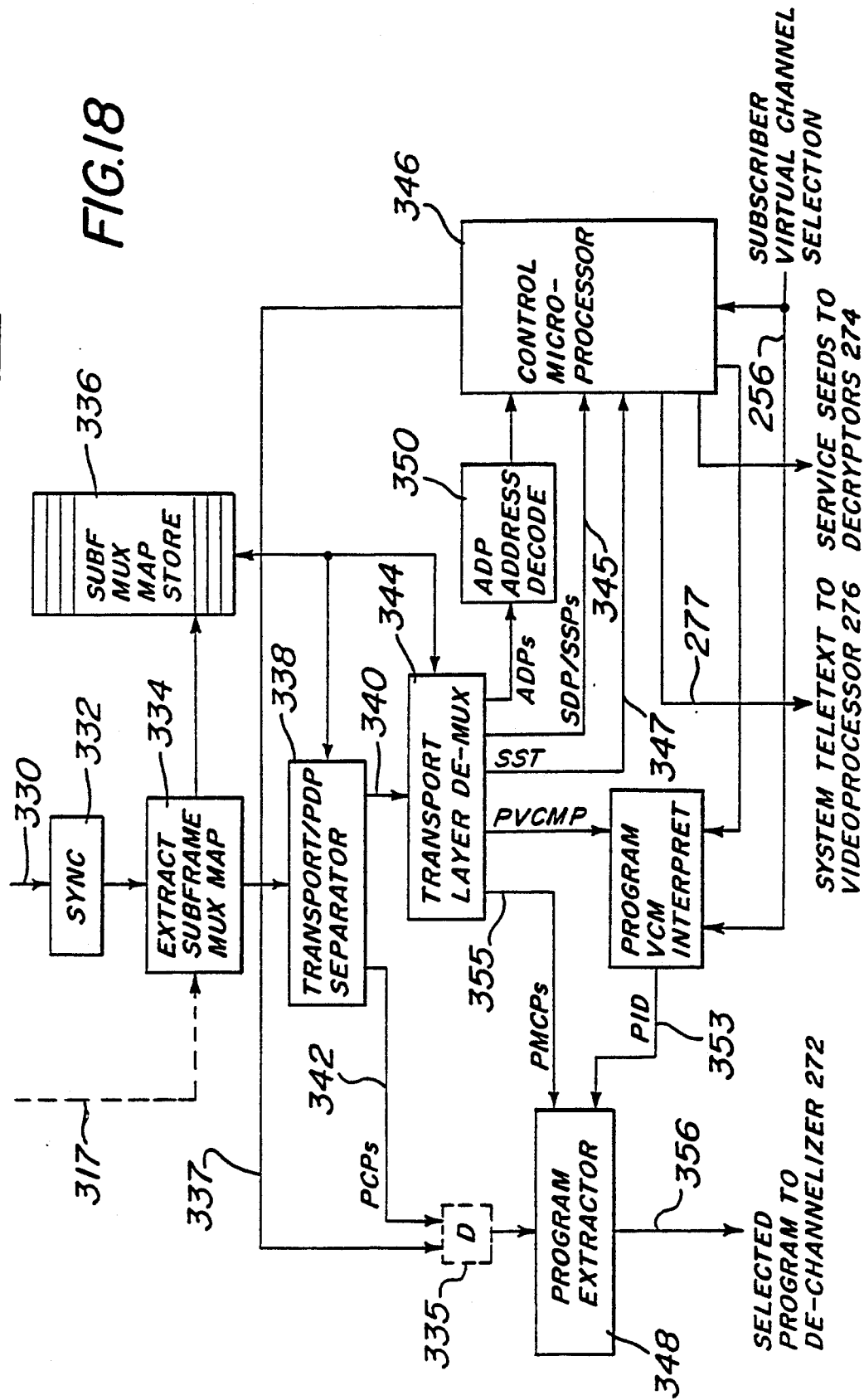

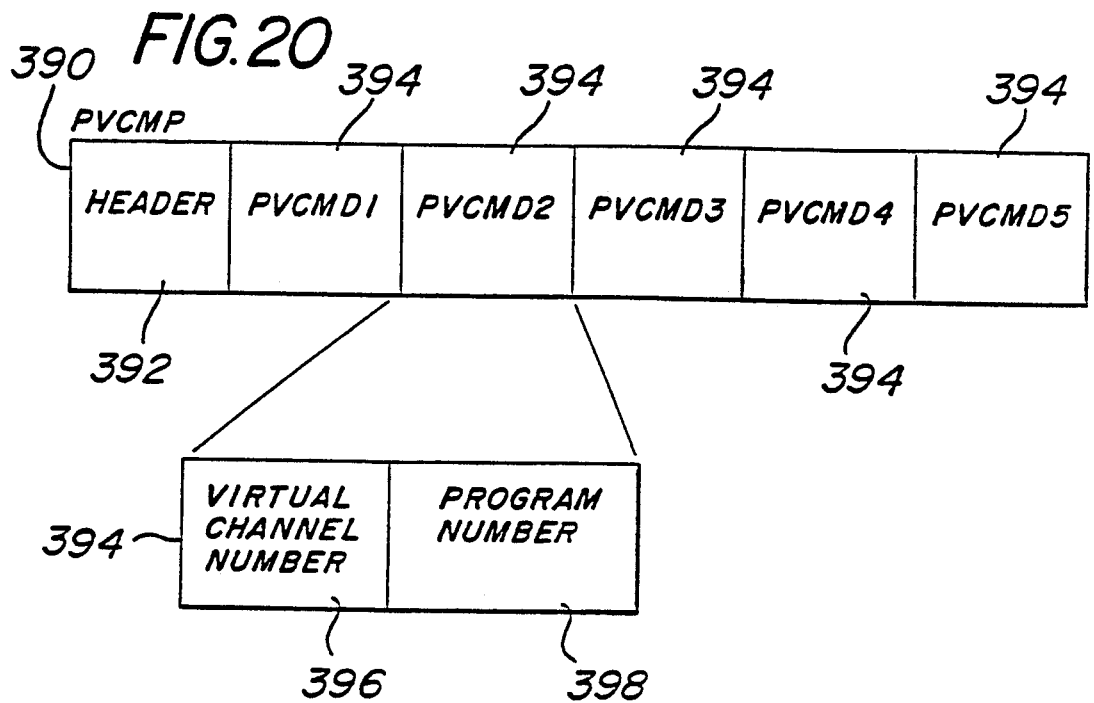
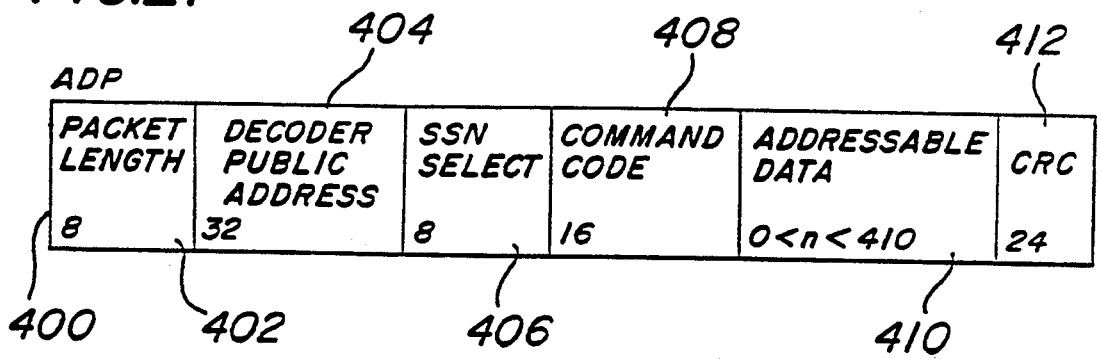
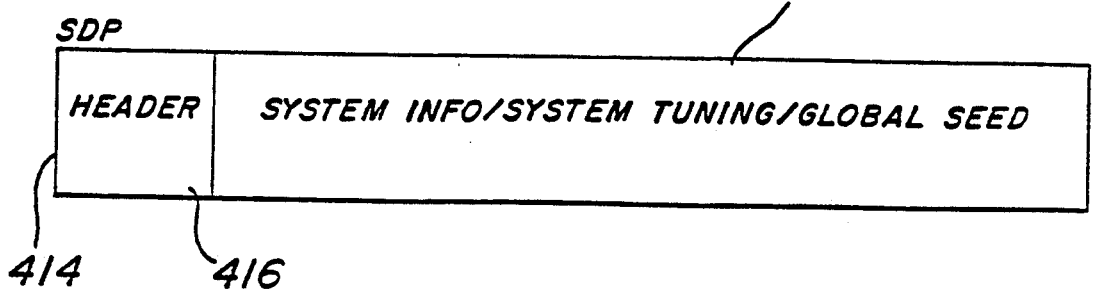

| BLOCK \ SUBFRAME | 1 | 2 | 3 | 4 | 5 | 6 | 7 | 8 |
|---|---|---|---|---|---|---|---|---|
| 2 | SUBF MUX MAP | SUBF MUX MAP | SUBF MUX MAP | SUBF MUX MAP | SUBF MUX MAP | SUBF MUX MAP | SUBF MUX MAP | SUBF MUX MAP |
| 3 | PMCP | PMCP | SSP (SEEDS) | PMCP | PMCP | PMCP | PMCP | PMCP |
| 4 | PMCP | PMCP | SSP (SEEDS) | PMCP | PMCP | PMCP | PMCP | PMCP |
| 5 | PVCMP | PVCMP | SSP (SEEDS) | STT | STT | STT | STT | STT |
| 6 | PVCMP | PVCMP | SSP (SEEDS) | STT | STT | STT | STT | STT |
| 7 | PVCMP | SDP | SSP (SEEDS) | STT | STT | STT | STT | STT |
| 8 | PVCMP | SDP | SSP (SEEDS) | STT | STT | STT | STT | STT |
| 9 | PVCMP | SDP | SSP (SEEDS) | STT | STT | STT | STT | STT |
| 10 | PVCMP | SDP | SSP (SEEDS) | STT | STT | STT | STT | STT |
| 11 | ADP | ADP | PMCP | ADP | ADP | ADP | ADP | ADP |
| 12 | ADP | ADP | PMCP | ADP | ADP | ADP | ADP | ADP |
| 13 | ADP | ADP | ADP | ADP | ADP | ADP | ADP | ADP |

FIG. 23

SYSTEM AND METHOD FOR MULTIPLEXING A PLURALITY OF DIGITAL PROGRAM SERVICES FOR TRANSMISSION TO REMOTE LOCATIONS

FIELD OF THE INVENTION

The present invention relates generally to digital signal transmission, and more particularly, to a system and method of multiplexing a plurality of digital services for transmission to a plurality of remote locations.

BACKGROUND OF THE INVENTION

The background of the present invention is described herein in the context of subscription television systems, such as cable television and direct broadcast satellite (DBS) systems, that distribute a variety of program services to subscribers, but the invention is by no means limited thereto except as expressly set forth in the accompanying claims.

In the subscription television industry, "programmers" produce "programs" for distribution to various remote locations. A "program" is a collection of related video, audio and other services, such as closed-captioning and teletext services. A single programmer may wish to supply many such programs. Typically, a programmer will supply these services via satellite to either individual subscribers (e.g., DBS subscribers), cable television operators, or both. In the case of cable television operators, the services transmitted via satellite are received at the operator's "cable head-end" installations. A cable operator typically receives programs and other services from many programmers and then distributes them to its subscribers. In addition, a cable operator may insert locally produced services at the cable-head end. The selected services and locally produced services are then transmitted to the individual subscribers via a coaxial cable distribution network. In the case of DBS subscribers, each subscriber is capable of receiving a satellite down-link from the programmers directly.

In the past, subscription television systems, including cable and DBS systems, have operated in the analog domain. Recently, however, the subscription television industry has begun to move toward all digital or hybrid analog/digital systems wherein prior to transmission, all or some of the analog signals are converted to digital signals. Digital signal transmission offers the advantage that digital data can be processed at both the transmission and reception ends to improve picture quality. In addition, digital data compression techniques have been developed that achieve high signal compression ratios. Digital compression allows a larger number of individual services to be transmitted within a fixed bandwidth. Bandwidth limitations are imposed by both satellite transponders and coaxial cable distribution networks, and therefore, digital compression is extremely advantageous.

In some prior art digital service transmission systems, various digital services, such as video services and audio services, are multiplexed into a single multiplex data stream for transmission to subscribers and cable operators. Unfortunately, these prior art systems are inflexible in many respects and cannot be easily adapted to meet the continuously changing requirements of the industry. There is a need, therefore, for a system and method of multiplexing a plurality of digital services that provides a high degree of flexibility so that the system can easily be adapted to meet the diverse and ever changing demands of the industry. In particular, such a system should be capable of multiplexing a wide variety of digital services. As those skilled in the art know, digital services vary widely in individual data rates. For example, digital audio service rates differ substantially from digital video service rates. A digital services delivery system must therefore be flexible in service data rate allocation within the system. Also, such a system should have an overall data transmission rate that is "scalable," i.e., that is adjustable over an almost continuous range. As those skilled in the art can appreciate, digital service delivery may take place via satellite, cable distribution networks, or even optical fiber networks. Each of these mediums has a unique bandwidth limitation, and therefore, accommodates a different maximum data rate. It is desirable, therefore, that a digital services delivery system provide adjustability (i.e., scalability) in the overall data transmission rate of the system.

In addition to service rate flexibility and overall data transmission rate scalability, a program services delivery system should provide for easy and cost efficient demultiplexing and re-multiplexing of the individual services being transmitted. Cable operators typically receive "programming" (i.e., related digital services) from a multitude of "programmers." Cable operators rarely provide their subscribers with every service provided by every programmer; more typically, cable operators select various services from each programmer and then provide only those selected services to their subscribers. Consequently, there is a need for a digital services delivery system and method that provides easy and cost-efficient de-multiplexing and re-multiplexing of various services. Regional hub distribution techniques will further emphasize this need.

As described hereinafter, the system and method of the present invention achieves each of the aforementioned objectives.

SUMMARY OF THE INVENTION

Briefly stated, the present invention is directed to a system and method for multiplexing a plurality of digital programs and transmitting the programs from an origination point to a plurality of remote locations. A program may comprise a collection of related digital services including video, audio, teletext, closed-captioning and "other data" services. According to the invention, digital programs to be transmitted are provided to an encoder at the origination point that generates a multiplex data stream which carries the programs to the remote locations via a transmission medium, such as a satellite or a cable distribution network.

According to the method of the present invention, the encoder first generates a plurality of subframe data streams each comprising a continuous sequence of subframes. Each subframe in each subframe data stream comprises at least a transport layer region and a program data region. For each subframe data stream, portions of the program data region of each of the subframes in that subframe data stream are allocated to selected ones of the plurality of programs; the size of each portion allocated to a respective program is related to a data rate of that program. According to the present invention, a single subframe data stream may carry one or more programs, as desired. For each subframe in a given subframe data stream, a program multiplex control packet is generated that specifies for that subframe which portions of the program data region of that subframe are allocated to each program. A plurality of system packets containing system-wide information are also generated for each subframe. The program multiplex control packet and system packets generated for a given subframe are inserted in the transport layer region of that subframe. A subframe multiplex map is then generated for each subframe that specifies the location of the program multiplex control packet and each of the system packets within the transport layer. The subframe multiplex map for a given subframe is inserted at the beginning of the transport layer region of that subframe.

After each subframe data stream has been constructed in the manner described above, a multiplex data stream is generated at the encoder that comprises a continuous sequence of superframes. Each superframe comprises a superframe transport layer region and a subframe data region. In accordance with the present invention, a portion of the subframe data region of each superframe is allocated to at least one subframe from each of the plurality of subframe data streams. A superframe map is then generated for each superframe that specifies at least the location of each subframe within the superframe. The superframe map is inserted in the transport layer region of the superframe. As the foregoing illustrates, the multiplex data stream comprises a hierachical frame structure consisting of superframes and subframes that carry the plurality of programs. In accordance with the present invention, the multiplex data stream is transmitted to a plurality of remote locations.

A decoder is provided at each remote location. In accordance with the present invention, a decoder recieves a multiplex data stream and extracts the superframe map from each incoming superframe. With the superframe map, the decoder is able to extract the individual subframes from each superframe, thereby recovering each subframe data stream from the multiplex data stream. For a selected subframe data stream, the decoder extracts the subframe multiplex map from each successive subframe in that subframe data stream in order to determine the location of the program multiplex control packet within each subframe. With the program multiplex control packets, the decoder is able to determine which portion of the program data region of each subframe is allocated to a selected program. In this manner, the decoder is then able to extract the selected program.

In accordance with a preferred embodiment of the present invention, the superframes of the multiplex data stream are transmitted to the plurality of remote locations at a constant frame rate. Preferably, portions of each superframe are transmitted in a byte-interleaved manner.

According to another aspect of the present invention, each superframe further comprises a plurality of blocks. A first portion of each block comprises a block synchronization code. A second portion of each block is reserved for superframe data which may comprise either a superframe synchronization word, a portion of the superframe transport layer region, or a portion of one of the subframes in the superframe. Each block ends with a block error code. According to a preferred embodiment, each of the blocks comprises 1600 bits. Preferably, the block synchronization code comprises 8 bits and the error code for each block comprises 160 bits.

According to another feature of the present invention, at an intermediate location, subframe data streams may be extracted from one multiplex data stream for re-routing within other multiplex data streams.

Further details and features of the present invention will become evident hereinafter.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings embodiments that are presently preferred, it being understood, however, that the invention is not limited to the specific methods and instrumentalities disclosed. In the drawings:

FIG. 16 is a detailed block diagram of the superframe demultiplexer of FIG. 14 in accordance with the present invention;

FIG. 17 shows in detail the general arrangement and contents of a superframe encryption seed packet in accordance with the present invention;

FIG. 18 is a block diagram showing details of the subframe demultiplexer of FIG. 14 in accordance with the present invention;

FIG. 20 shows in detail the general arrangement and contents of a program virtual channel map packet in accordance with the present invention;

FIG. 21 shows in detail the general arrangement and contents of an exemplary addressable data packet in accordance with the present invention;

FIG. 22 shows in detail the general arrangement and contents of an exemplary system data packet in accordance with the present invention;

FIG. 23 illustrates the contents of the first 13 blocks of 8 consecutive subframes (i.e., one nominal "cryptocycle") transmitted in accordance With the present invention;

DETAILED DESCRIPTION OF THE DRAWINGS

Figure 1:
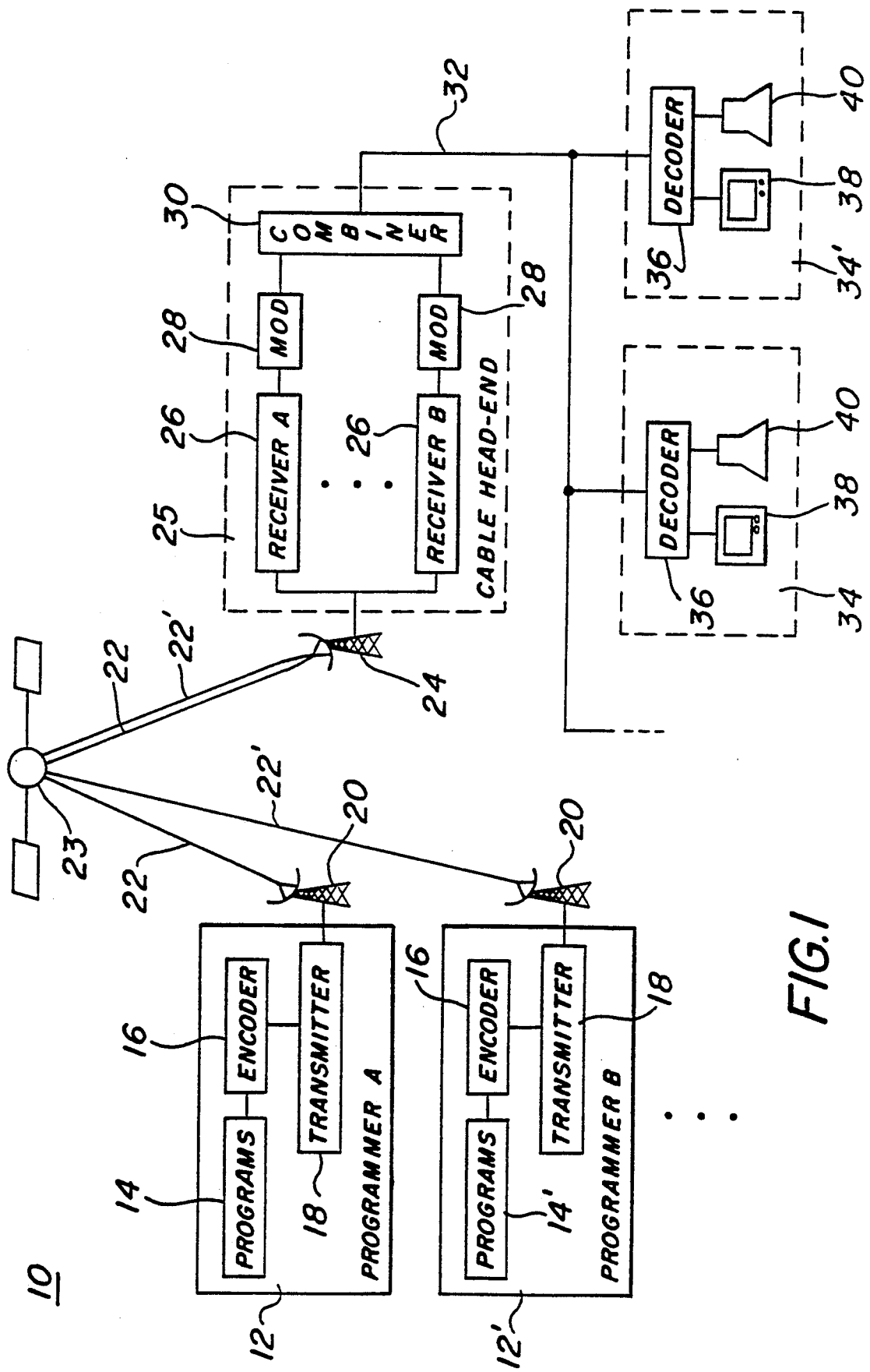
FIG. 1 illustrates an application of the present invention to a subscription television system.

In the drawings, like numerals indicate like elements throughout. As with the Background of the Invention, the following detailed description is presented in the context of a subscription television system that distributes a variety of program services to subscribers, but the invention is by no means limited thereto except as expressly set forth in the accompanying claims.

FIG. 1 illustrates an application of the present invention to a subscription television system 10 wherein "programs" comprising a collection of digital services, such as video, audio, teletext, closed-captioning and other digital services, are communicated from a plurality of "programmer" locations 12, 12' to a plurality of remote locations, e.g. locations 25, 34 and 34'. Any number of "programmers" may be present in the system 10. Each programmer provides a variety of programs 14 to a respective encoder 16 that operates to multiplex the individual digital services of each program and thereby generate, in accordance with the method of the present invention, a multiplex data stream for transmission to a plurality of remote locations. Details of the encoders 16 will be provided hereinafter. The multiplexed data stream generated by each encoder 16 is provided to a transmitter 18 and then to a satellite up-link 20. By way of example in FIG. 1, the encoder 16 operated by programmer A generates a multiplexed data stream 22; the encoder 16 operated by programmer B generates a multiplexed data stream 22'. Each stream 22, 22' is transmitted via a satellite 23 to a cable head-end installation 25. It is understood that there may be many programmers in the system of the present invention, and therefore, a plurality of multiplex data streams may be transmitted via satellite 23 to remote locations such as the cable head-end installation 25. Although not shown, multiplex data streams may be received via satellite at locations other than a cable head-end, such as, for example, at the locale of a direct broadcast satellite (DBS) subscriber.

A satellite down-link 24 at the cable head-end installation 25 provides each stream 22, 22' to a respective receiver 26 at the cable head-end 25. As those skilled in the art know, cable head-end installations provide subscription television signals to cable subscribers via a cable distribution network. Coaxial cables used in cable distribution networks have the capacity to carry a plurality of contiguous 6, 7 or 8 MHz channels. In accordance with the preferred embodiment of the present invention, each multiplex data stream received at the cable head-end is fed from its respective receiver 26 to a modulator 28, where it is modulated on a distinct 6 MHz cable channel. Although 6 MHz channels are employed in the preferred embodiment, 7 or 8 MHz channels may be employed. In the preferred embodiment, the modulators 28 employ 4-VSB (vestigial sideband) modulation, however, any suitable modulation technique may be employed. Each of the modulated data streams is then provided to a combiner 30 that combines the individual 6 Mhz channels into a single wide-band signal that is then transmitted via a cable distribution network 32 to a plurality of cable subscriber locations, e.g. 34 and 34'. Each subscriber location 34, 34' has a decoder 36 that functions in accordance with the present invention to extract selected digital services from a selected multiplex data stream for display on a television set 38 or output to an audio device 40. Details of the decoders 36 will be provided hereinafter. As mentioned above, FIG. 1 illustrates an application of the system and method of the present invention to a subscription television system. It is understood, therefore, that the encoders, decoders and other apparatus described hereinafter may be employed in any application that involves the communication of digital services to a plurality of remote locations and devices other than television receivers such as digital computers.

Figure 2:
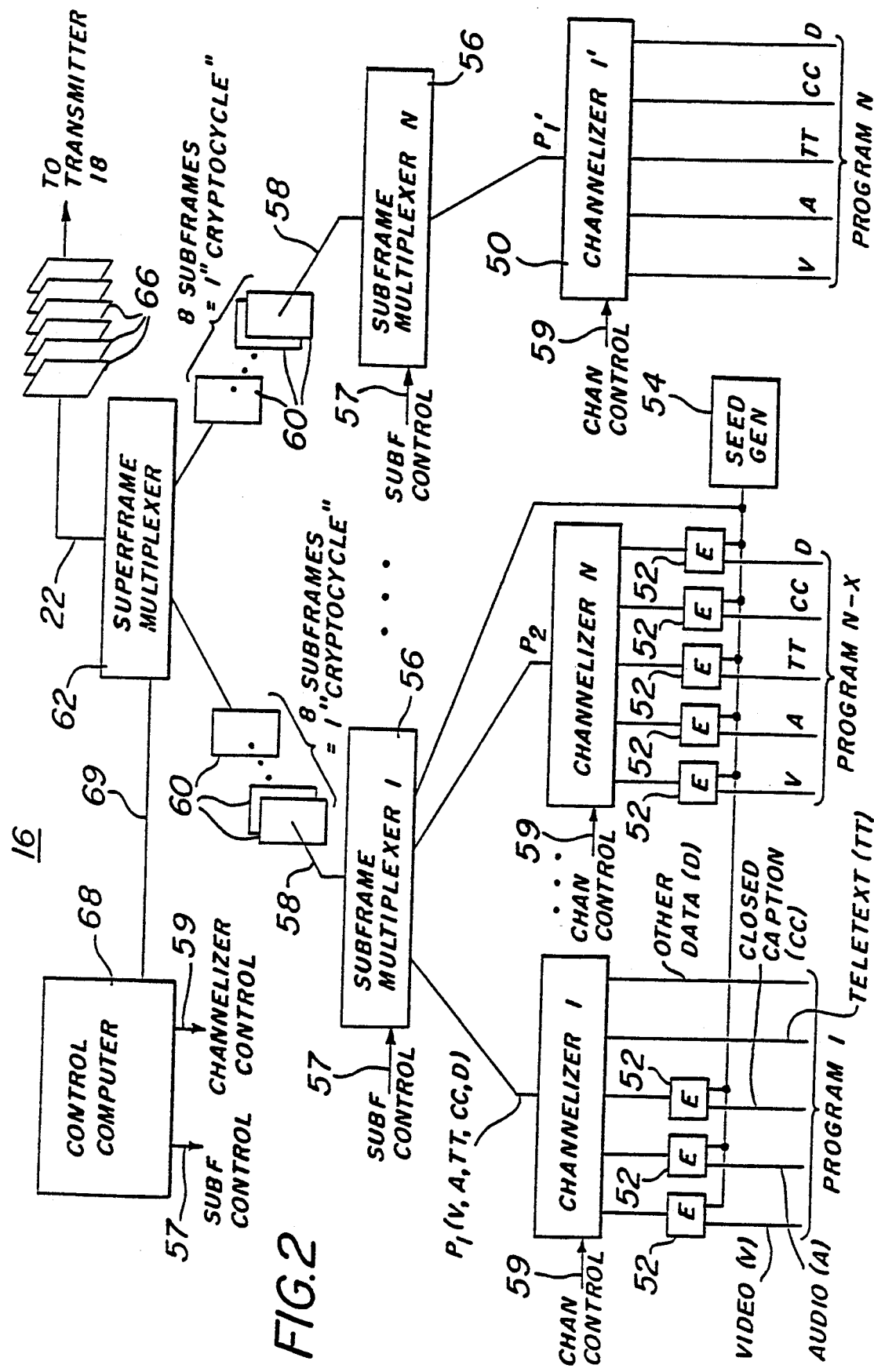
FIG. 2 is a block diagram of an encoder for generating a multiplex data stream in accordance with the method of the present invention.

FIG. 2 is a block diagram of an encoder 16 for generating a multiplex data stream in accordance with the method of the present invention. As shown, the encoder 16 receives at respective inputs thereof a plurality of programs (e.g. programs 1 to N). As mentioned in the Background of the Invention, a program comprises a collection of related digital services, including video (V), audio (A), teletext (TT), closed-captioning (CC) and other data (D). For example, a program may be a subscription television program comprising a video service and its related audio and closed-captioning information. Alternatively, a program may simply comprise a single audio service. The "other data" (D) may be computer data or any other type of digital data, such as, for example, panscan control information and/or EIDAK copy protection information related to the video service in a particular program. In many applications, video and audio services will be compressed. As those skilled in the art know, there are many video and audio compression techniques available. For example, the Motion Pictures Expert Group (MPEG) has developed a video compression algorithm that is widely used in the digital video services industry. Vector quantization is another, more recent compression technique for digital video. Those skilled in the art understand that the encoder 16 functions independently of any data compression, and therefore, both compressed and uncompressed services may be input to the encoder 16.

As shown, the services that comprise each program are fed to a channelizer 50 that combines the services into a single packetized data stream referred to herein as a "program data stream" or simply a "program". In the preferred embodiment, the channelizers 50 employ the Motion Picture Expert Group's (MPEG) systems level protocol (ISO 11172) for generating the program data streams. As those skilled in the art understand, the MPEG systems level protocol specifies a synchronized packet syntax for combining multiple digital services, such as video, audio, teletext, closed-captioning and other data. For a detailed explanation of the MPEG systems level syntax, see "Coding of Moving Pictures and Associated Audio for Digital Storage Media—Part One: Systems," ISO 11172, rev. 1 (Nov. 29, 1991). Although the MPEG systems level protocol provides a convenient method for combining related digital service data into a single program data stream, those skilled in the art will understand that the particular protocol used by the channelizers 50 is not critical to the present invention. Any protocol that specifies a syntax for generating a synchronized combination of related digital services within a single bitstream may be employed without deviating from the spirit and scope of the present invention. For example, a method of channelizing individual services that employs variable-length frame formats with headers that describe the length and contents of each frame may be employed.

As shown in FIG. 2, the digital services input to a given channelizer 50 may be encrypted with individual service encryptors 52. According to the method of the present invention, any service may be transmitted encrypted or unencrypted. Thus, as illustrated in FIG. 2, any number of services in a given program may be encrypted. For example, only the video, audio and teletext services of program1 are encrypted, whereas all of the services of program2 are being encrypted; none of the services of program N are being encrypted. Digital service encryptors are well known to those skilled in the art, and there are many encryption techniques and many ways to implement an encryptor. In the present invention, the encryptors 52 are not limited to any one technique or implementation. However, an important feature of the present invention is that each digital service, if encrypted, is independently encrypted.

Data encryptors, such as encryptors 52, typically use a "seed" value to generate a pseudo-random binary sequence which is then convolved, typically via modulo-2 addition, with the service data stream to produce an encrypted service stream. Accordingly, the encoder 16 includes a service seed generator 54 for supplying each encryptor 52 with its own "seed" value. Thus, each encrypted service is individually encrypted using a unique service seed. As those skilled in the art know, a service can be decrypted as long as the decryptor has the "seed" used to encrypt the service. According to the present invention, the seed used to encrypt a given service is changed periodically in order to enhance cryptographic strength. As described hereinafter, the service seeds are transmitted to the remote locations in service seed packets (SSPs). Details of the contents and arrangement of the SSPs are provided hereinafter.

As those skilled in the art will appreciate, time is needed at a remote location to receive the seeds and process them in order to be ready to decrypt the incoming encrypted service data. As described hereinafter in more detail, encryption seeds are transmitted to remote locations in advance of the data the seeds were used to encrypt. This allows the decoder at each remote location enough time to have the seeds ready for the decryption process and avoids unnecessary buffering of the incoming service data stream.

Still referring to FIG. 2, each program data stream generated by a channelizer 50 is fed to at least one subframe multiplexer 56. As shown, there may be a plurality of subframe multiplexers 56 in a single encoder 16. According to the present embodiment, each subframe multiplexer 56 may receive up to 60 program data streams. As illustrated, however, a subframe multiplexer 56 (e.g. subframe multiplexer N) may receive only one program data stream. Subframe control information provided by a control computer 68 via line 57 to each subframe multiplexer 56 specifies, for each multiplexer 56, how many program data streams that multiplexer 56 is receiving. Programmers must supply this information to the control computer prior to operating the encoder 16. As those skilled in the art will appreciate, independent control of each subframe multiplexer 56 via the control computer 68 provides a significant degree of flexibility to the programmer.

As described hereinafter in greater detail, each subframe multiplexer 56 operates in accordance with the method of the present invention to generate a subframe data stream 58 that comprises a continuous sequence of subframes 60. As described hereinafter, each subframe 60 contains a program data region and a "subframe transport layer." A subframe multiplexer 56 allocates portions of the program data region of each subframe 60 to respective ones of the program data streams input to the multiplexer 56. The "transport layer" of each subframe contains certain "system data" necessary for operating the system of the present invention. Because certain types of system data are too numerous to transmit in a single subframe, these types of data are transmitted over a series of subframes referred to herein as a "cryptocycle." According to the present embodiment, a cryptocycle nominally comprises eight (8) subframes; however, a cryptocycle can be defined by any number of subframes. Essentially, cryptocycles define fixed boundaries in the subframe data stream 58 within which a complete set of system and encryption related data is transmitted. Further details of the general arrangement and content of each subframe, as well as details of the subframe multiplexers 56, will be provided hereinafter. Other types of system data, even more numerous than those transitted within a cryptocycle can be sent over an arbitrarily large number of subframes.

As described above, the various services of a given program may be individually encrypted using a unique service seed, and the seeds used to encrypt each service are changed periodically. More specifically, according to the present invention, the service seeds are changed every cryptocycle, i.e., every (8) subframes. Thus, a given seed value is used to encrypt a particular program service over 8 subframes and then changed. Changing the service seeds every cryptocycle enhances the cryptographic strength of the system. As also described above, the service seeds are transmitted to remote locations in service seed packets (SSPs). Service seed packets (SSPs), when needed, are generated within the appropriate subframe multiplexer 56. For example, in FIG. 2, the seeds used to encrypt the services of program1 and program N-x, are provided to subframe multiplexer 56 which generates the SSP(s) needed to carry those seeds to remote locations. Details of the contents and arrangement of an SSP are provided hereinafter.

Referring still to FIG. 2, the individual subframes 60 generated by each subframe multiplexer 56 are successively supplied to a superframe multiplexer 62, as shown. As described hereinafter in greater detail, the superframe multiplexer 62 operates in accordance with the method of the present invention to generate a multiplex data stream 22 comprising a continuous sequence of superframes 66. A superframe 66 contains at least one subframe 60. Preferably, however, a superframe 66 contains multiple subframes 60. For example, a superframe 66 may contain one subframe 60 from each of the subframe data streams 58 input to the superframe multiplexer 62. As those skilled in the art will appreciate, the superframe multiplexer 62 provides an additional level of multiplexing within the encoder 16. As with the subframe multiplexers 56, the superframe multiplexer 62 receives control information from the control computer 68 via line 69.

As best illustrated in FIG. 1, the multiplex data stream 22 generated within the encoder 16 by the superframe multiplexer 62 is sent to a transmitter 18 for transmission to remote locations. In the subscription television context, the multiplex data stream is transmitted via satellite 23, however, those skilled in the art will appreciate that a multiplex data stream 22 generated in accordance with the method of the present invention is by no means limited to transmission via satellite, but may be transmitted via a variety of transmission mediums depending upon the particular application of the present invention. For example, a multiplex data stream 22 generated in accordance with the present invention may be transmitted via a fiber optic cable or a micro-wave link.

Figure 3:
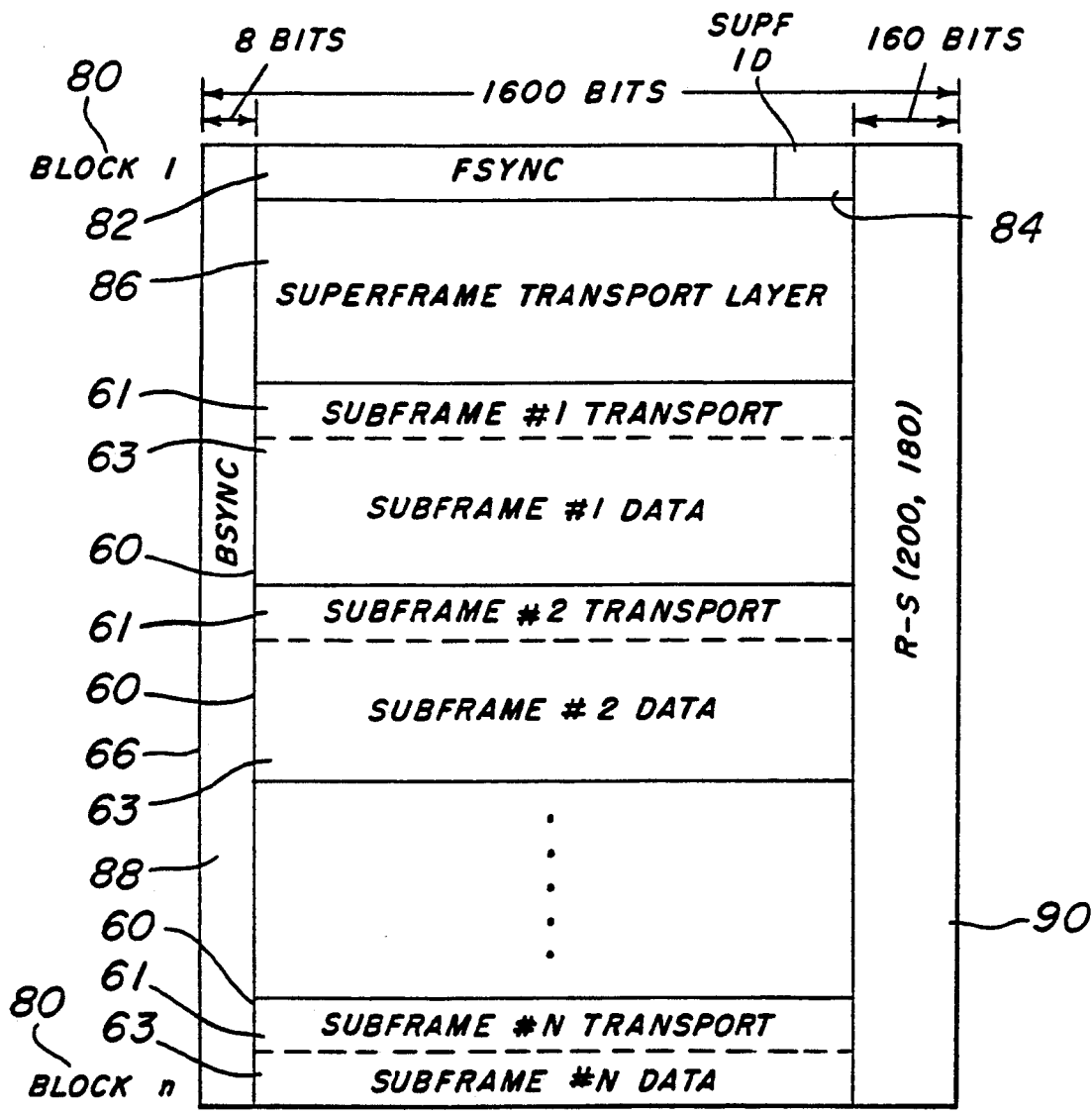
FIGS. 3 and 3(a) illustrates the general arrangement and contents of an exemplary superframe in accordance with the present invention.
Figure 3A:
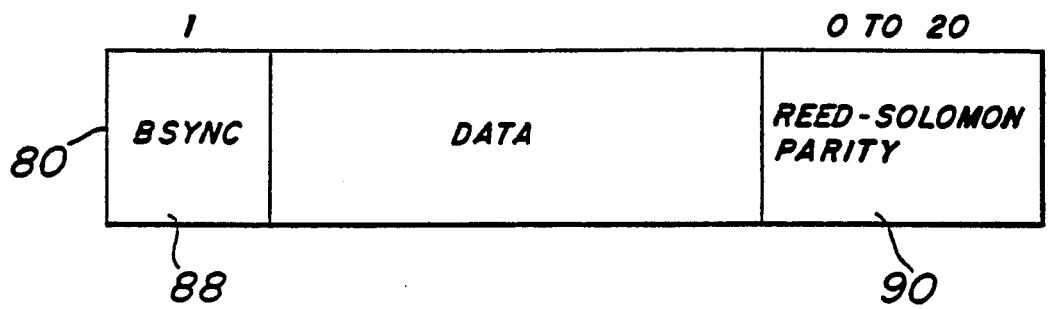

FIG. 3 illustrates the general arrangement and contents of a superframe 66. As mentioned, the multiplex data stream generated by the encoder 16 comprises a continuous sequence of superframes 66. At the lowest level, a superframe comprises a plurality of blocks 80 which, in the preferred embodiment are each 200 bytes (i.e., 1600 bits) wide. The fundamental structure of each block is shown in FIG. 3a. As illustrated in FIG. 3a, each block begins with a BSYNC byte. The BSYNC byte 88 is the same for each block, and as described hereinafter, the BSYNC bytes 88 of each block are employed together with an FSYNC word (described hereinafter) to establish frame synchronization at remote locations. Each block 80 of the superframe 66 ends with a block error code 90. In the preferred embodiment, a Reed-Solomon error coding technique is employed that generates 20 Reed-Solomon error code bytes for every block. As each block in the preferred embodiment is 1600 bits wide (i.e., 200 bytes), there are 179 bytes (i.e., 1432 bits) left for data. While a Reed-Solomon error coding technique is employed in the preferred embodiment, those skilled in the art will appreciate that any block-oriented error coding scheme may be employed without deviating from the true spirit and scope of the present invention. Furthermore, although in the preferred embodiment, 20 bytes of error coding are produced for each block, less than or more than 20 bytes may be employed. Moreover, although each block is 1600 bits wide in the preferred embodiment, other block lengths may be employed. Those skilled in the art will appreciate that the amount of data space available in each block will depend upon both the overall length of the block and the number of bytes reserved for error coding within each block 80.

Referring again to FIG. 3, at a higher level, the superframe 66 comprises, in a first block thereof, an FSYNC word and a superframe ID 84. The FSYNC word 82 and superframe ID 84 are followed by a "superframe transport layer" 82. As described hereinafter, the superframe transport layer contains information concerning the overall content of the superframe, as well as system related information necessary for operation of the system of the present invention. As further shown, the superframe transport layer 86 is followed by a plurality of subframes 60. Each subframe 60 comprises a subframe transport layer 61 and a subframe data region 63 (sometimes hereinafter referred to as a "program data region"). Further details of the superframe transport layer 86 and a typical subframe 60 will be provided hereinafter. As mentioned above, each block in the superframe 66 begins with a BSYNC byte 88 and ends with a number of error code bytes 90.

According to the present invention, superframes are transmitted at a constant frame rate, $F_{SF}$. With a constant frame rate, the overall transmission rate of a multiplex data stream can be expressed as:

$$F_{SF} * \frac{n \text{ blocks}}{\text{frame}} * \frac{L_B \text{ bits}}{\text{block}} = nF_{SF}L_B \text{ bps}$$

where $F_{SF}$ is the overall frame rate;

$L_B$ is the length of each block (in bits); and n is the number of blocks in each superframe.

As can be seen, therefore, the overall data rate of the multiplex data stream generated by an encoder 16 depends upon the frame rate, the number of blocks per frame, and the length of each block. These parameters may be selected according to the requirements of a given application. As those skilled in the art will appreciate, the method of the present invention provides a fixed, but adjustable frame approach. The decoders at each remote location may be uniquely manufactured for a given application based on a frame size, frame rate and block length selected for that application, or alternatively, a re-configurable decoder may be employed that can receive these dimensional parameters from an encoder and automatically adjust to the particular block length, frame size and frame rate chosen. For example, as described hereinafter in greater detail, these dimensional parameters may be provided in a system data packet (SDP) that may be transmitted to each decoder in accordance with an aspect of the present invention.

As mentioned above, in the preferred embodiment, each block is 1600 bits wide (i.e., 200 bytes). Consequently, the overall transmission rate of the multiplex data stream generated by each encoder 16 in the system 10 can be expressed as $$F_{SF} * \frac{n \text{ blocks}}{\text{frame}} * \frac{1600 \text{ bits}}{\text{block}} = nF_{SF}(1600) \text{ bps}$$

Depending upon the selected frame rate $F_{SF}$, therefore, each additional block in the superframe 66 increments the overall data rate by 1600 $F_{SF}$) bps. Table 1 shows the data rate increments that result for several exemplary frame rates.

TABLE 1

INCREMENTS IN OVERALL DATA RATE OF
MULTIPLEX DATA STREAM VS. FRAME RATE
ASSUMING 200 BYTES BLOCKS

| FRAME RATE | DATA RATE INCREMENTS (bps) |
|---|---|
| 20 Hz | 32,000 |
| 25 Hz | 40,000 |
| 30 Hz | 48,000 |
| 40 Hz | 64,000 |
| 50 Hz | 80,000 |
| 60 Hz | 96,000 |

As explained above, although the frame size (in blocks) and the rate at which successive superframes are transmitted (i.e., the frame rate) are adjustable, they are fixed for a given application. As those skilled in the art will appreciate, a fixed frame approach is advantageous for synchronization purposes and also reduces the likelihood of data transmission errors over high bit rate, error-prone channels. The adjustability of these parameters, however, is advantageous because the overall data rate of the multiplex data stream generated by an encoder 16 is scalable and may be optimized for various transmission medium characteristics. Furthermore, adjustability provides an inherent degree of upgradeability to the system of the present invention so that future applications may be accommodated. As can be seen, therefore, the present invention provides an extreme degree of flexibility not present in prior art digital signal transmission systems. Further details of the content and arrangement of data within a superframe is provided hereinafter.

Figures 4, 5, 7:
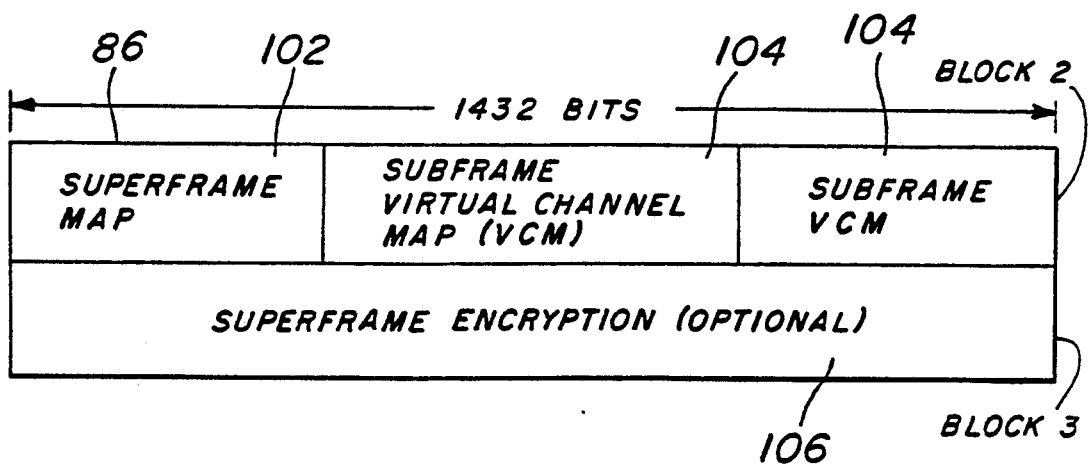
FIG. 4 shows the general arrangement and contents of a superframe ID that is carried in a first block of each superframe in accordance with the present invention.
FIG. 5 illustrates the general arrangement and contents of the superframe transport layer region of FIG. 3.
FIG. 7 shows in detail the general arrangement and contents of an exemplary program data packet in accordance with the present invention.

FIG. 4 shows the general arrangement and contents of the superframe ID 84 that is carried in the first block of each superframe. As shown, the superframe ID 84 includes a transmitter ID field 96 that identifies the transmitting entity of the multiplex data stream. For example, in the subscription television system 10 of FIG. 1, the transmitter ID 96 may specify which programmer generated a given multiplex data stream. A superframe transport block count 98 specifies the number of blocks 80 in the superframe 66. As mentioned, the number of blocks 80 in a superframe 66 determines the overall data rate of the multiplex data stream. A Reed-Solomon t-strength field 100 provides an indication of the t-strength of the Reed-Solomon code being employed to error code each block. As those skilled in the art know, various transmission media have different error characteristics. According to the present invention, the t-strength of the Reed-Solomon coding technique may be adjusted, or optimized, for a given transmission medium. The remainder of the superframe ID 84 comprises spare bits that may be reserved for future use.

FIG. 5 illustrates the general arrangement and contents of the superframe transport layer 86. In general, the transport layer of each superframe contains system related data needed for operation of the present invention. The superframe transport layer 86 is functionally similar to the subframe transport layers 61 (described hereinafter) of each subframe 60, but controls a higher level in the multiplexing hierarchy. Although the transport layer 86 illustrated in FIG. 5 spans only two blocks of the superframe 66, a given superframe transport layer 86 may comprise as many blocks as needed to carry the requisite information. As shown, in the present embodiment, the superframe transport layer 86 is 1432 bits wide (i.e., 1600 bits/block - 8 BSYNC bits - 160 Reed-Solomon error coding bits).

As mentioned above, the superframe transport layer 86 contains information necessary for operation of the system of the present invention. In particular, the superframe transport layer comprises a plurality of transport layer packets including a superframe map 102, one or more subframe virtual channel maps 104 and an optional superframe encryption packet 106. Details of the contents and arrangement of each superframe transport layer packet will be provided hereinafter.

Figure 6:
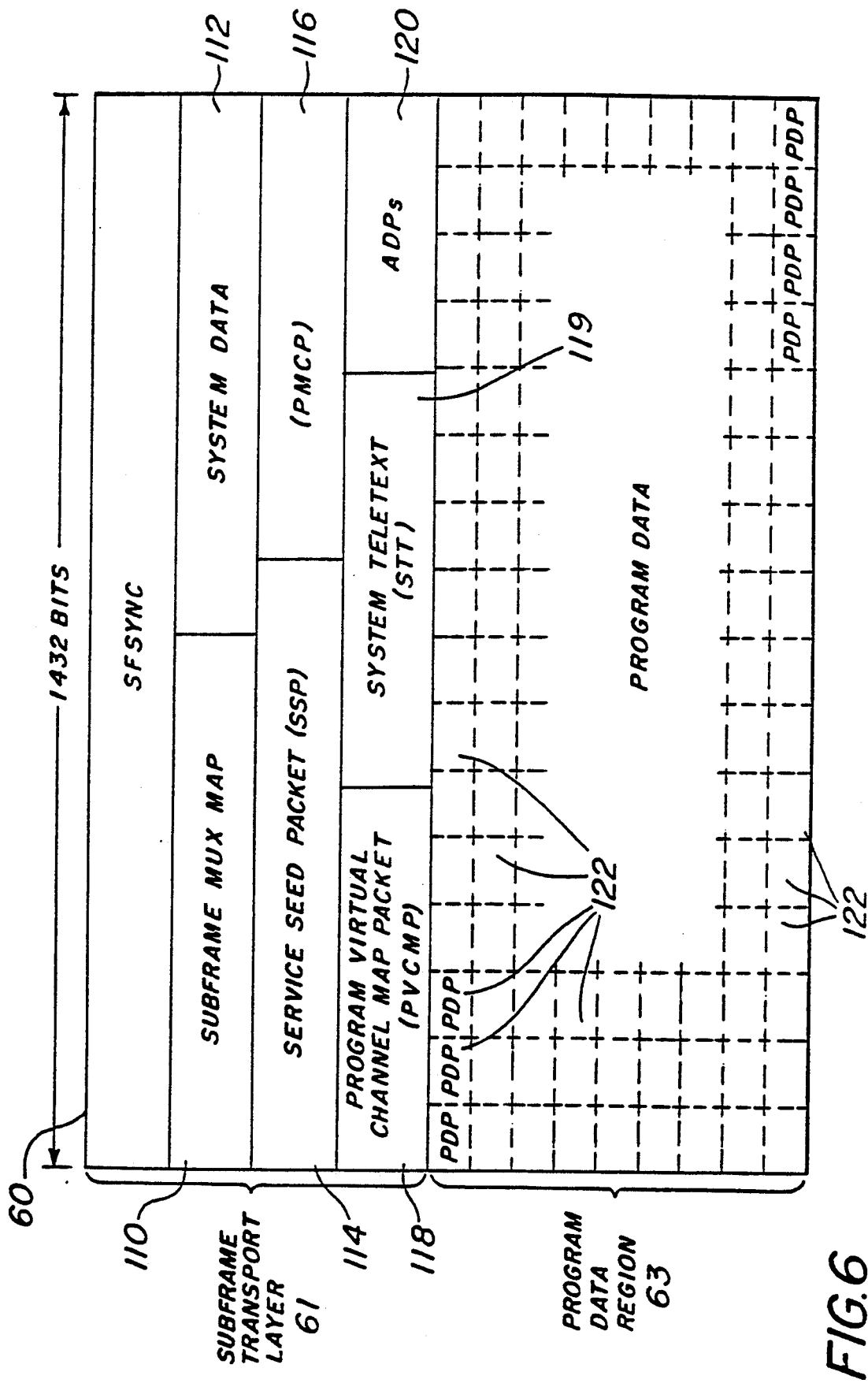
FIG. 6 shows in detail the general arrangement and contents of an exemplary subframe in accordance with the present invention.

FIG. 6 shows further details of the general arrangement and contents of an exemplary subframe 60. As shown, the first line or block of the subframe transport layer 66 comprises an optional subframe sync word (SFSYNC). As with the FSYNC and BSYNC words in a superframe, the SFSYNC word in each subframe 60 may be used to facilitate synchronization at remote locations. Immediately following the SFSYNC in the second block of every subframe 60 is a subframe multiplex map 110. Subsequent portions of the transport layer 61 may comprise system data packets 112 (SDPs), service seed packets 114 (SSPs), program multiplex control packets 116 (PMCPs), program virtual channel map packets 118 (PVCMPs), system teletext packets 119 (STTs), and addressable data packets 120 (ADPs). In accordance with the method of the present invention, the subframe multiplex map 110 is transmitted with each subframe and specifies the number and location of every other type of packet in the transport layer 61 of that subframe. With the subframe multiplex map 110, the number and location of each other type of transport layer packet may be dynamically altered every subframe to achieve a great degree of flexibility. For example, the subframe multiplex map 110 may be used in a "full-frame" mode to allow an entire field of the multiplex data stream to be used for non-program data such as addressable data packets 120 (ADPs) It should be noted that not every type of transport layer packet need be transmitted in every subframe. For example, some packets, such as service seed packets 114 (SSPs), may be transmitted only in the first few subframes of a cryptocycle. Also, more than one of each type of packet may be transmitted in a given subframe. Further, the packets are not constrained to fit exactly within the chosen block length and thus may "wrap around" from one block to the next. The content and arrangement of data within each packet will be described hereinafter in greater detail.

Still referring to FIG. 6, the transport layer 61 of each subframe is followed by a program data region 63. As shown, the program data region 63 comprises a plurality of smaller program data packets 122 (PDPs). In the present embodiment, the PDPs are each 60 bits wide, although any size PDP may be used without deviating from the spirit and scope of the invention. Each of the 60 bits in a PDP may be allocated to a particular program data stream input to the subframe multiplexer 56 constructing the subframe 60. For example, if 5 programs are input to the subframe multiplexer 56, each program could be allocated 12 bits out of every PDP. According to the method of the present invention, the 60 bits in each PDP are allocated among the various program data streams in proportion to the individual data rate of each program data stream. For example, a program having a high rate may be allocated more bits in each PDP than a program having a lower rate. With the ability to flexibly allocate bits among various programs, the present invention is capable of handling a variety of diverse program data rates from high rates of 16 to 18 Mbps to very low computer-oriented rates of 9600 bps or less. Those skilled in the art will appreciate that no limit on program data rate is imposed by the multiplex framing hierarchy itself; rather, the overall transmission bandwidth and number of programs will be the limiting factors. Although the allocation of PDP bits in a given subframe remains fixed, the allocation may be re-adjusted every subframe. As explained hereafter in greater detail, the program multiplex control packets (PMCPs) 116 in the transport layer 61 specify the program allocation Within the PDPs of a given subframe. Because the PMCPs are transmitted in the transport layer of every subframe, the allocation of programs within each PDP may be dynamically altered every subframe. In this manner, the system and method of the present invention supports statistical multiplexing.

FIG. 7 shows the contents of an exemplary PDP 122. In the example shown, four program data streams (i.e., programs), labeled 1, 2, 3 and 4, are being input to a subframe multiplexer 56 As just explained, the subframe multiplexer 56 allocates a portion of each PDP 122 in a given subframe to each of the programs in proportion to the individual data rates of each program. In this example, programs 1 and 2 have higher individual data rates than programs 3 and 4, and consequently, programs 1 and 2 are each allocated 20 bits of the PDP 122, while programs 3 and 4 are each allocated only 10 bits. As mentioned, the allocation of bits within each PDP is adjustable on a per subframe basis. Although in the present embodiment the PDPs are sixty (60) bits wide, the PDPs may be any width, such as 80 bits wide or 120 bits wide, without deviating from the spirit and scope of the present invention.

Figure 8:
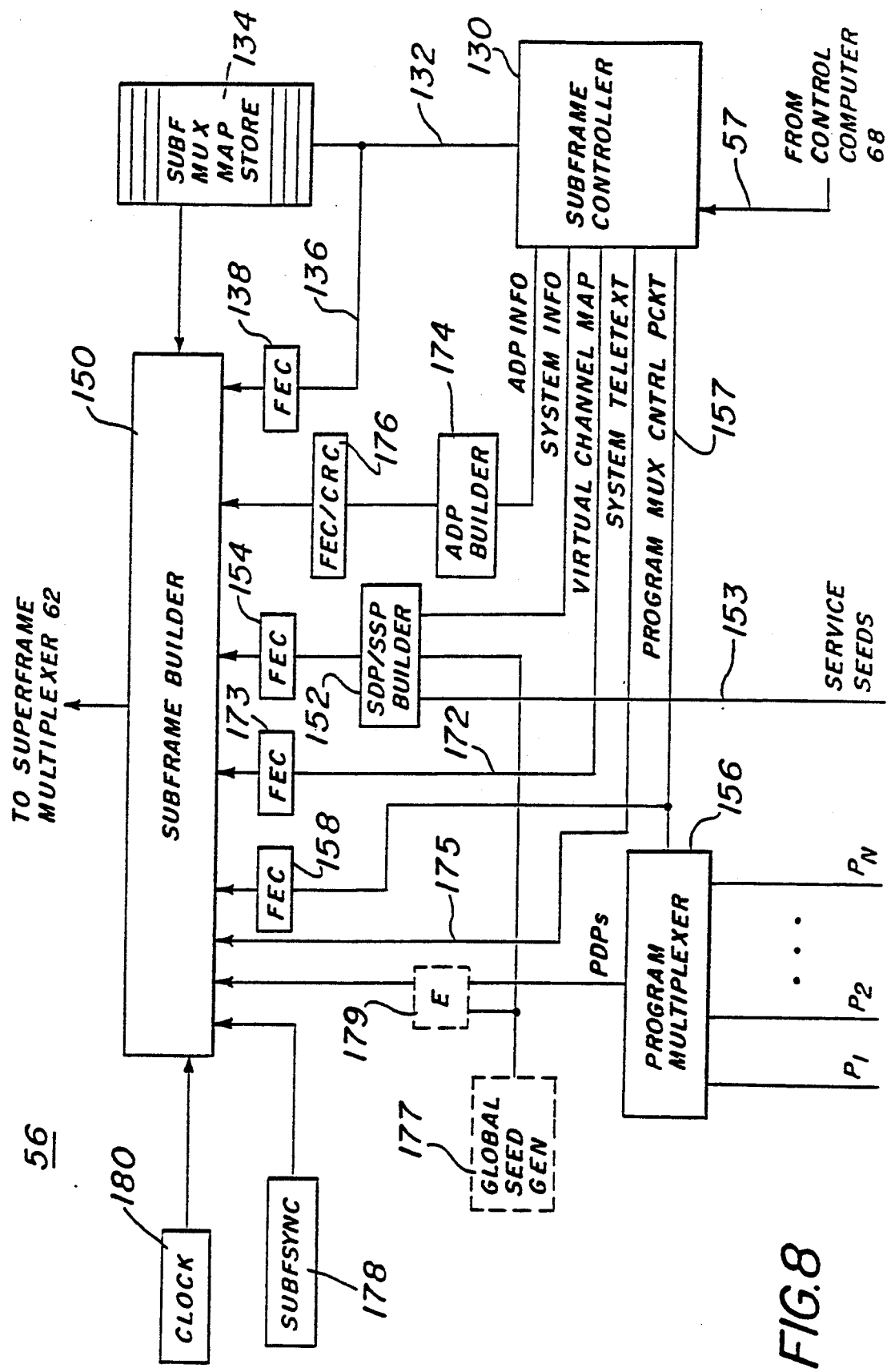
FIG. 8 is a block diagram of a subframe multiplexer employed in the encoder of FIG. 2 in accordance with the present invention.

FIG. 8 is a block diagram of a subframe multiplexer 56 according to the present invention. As mentioned, a subframe multiplexer 56 operates in accordance with one aspect of the method of the present invention to multiplex a plurality of program data streams. As shown in FIG. 8, therefore, a plurality of program data streams (i.e., programs), $P_1 \ldots P_N$, are input to the subframe multiplexer 56. By way of example, these program data streams may be the programs input to "subframe multiplexer 1" of FIG. 2.

The subframe multiplexer 56 comprises a controller 130 that controls the overall operation of the subframe multiplexer 56. Various parameters are input to the controller 130 by the control computer 68 (FIG. 2), such as how many programs are input to the multiplexer 56, which individual program services are encrypted, and what system related information is to be transmitted with each subframe generated by the subframe multiplexer 56. In response to this information, the controller 130 generates, for each subframe, a subframe multiplex map which, as described above, specifies the number and location of various packets in the transport layer of that subframe. Details of the contents and arrangement of the subframe multiplex maps will be provided hereinafter. To generate each subframe, the controller 130 feeds the subframe multiplex map for that subframe to a storage memory 134. As described hereinafter, a subframe builder 150 "reads" the subframe multiplex map in order to construct the particular subframe being generated. As described previously, the subframe multiplex map is carried in the subframe in the first block following the block containing the SFSYNC word. Accordingly, the controller 130 also feeds the subframe multiplex map to the subframe builder 150 via line 136, as shown.

Figure 9:
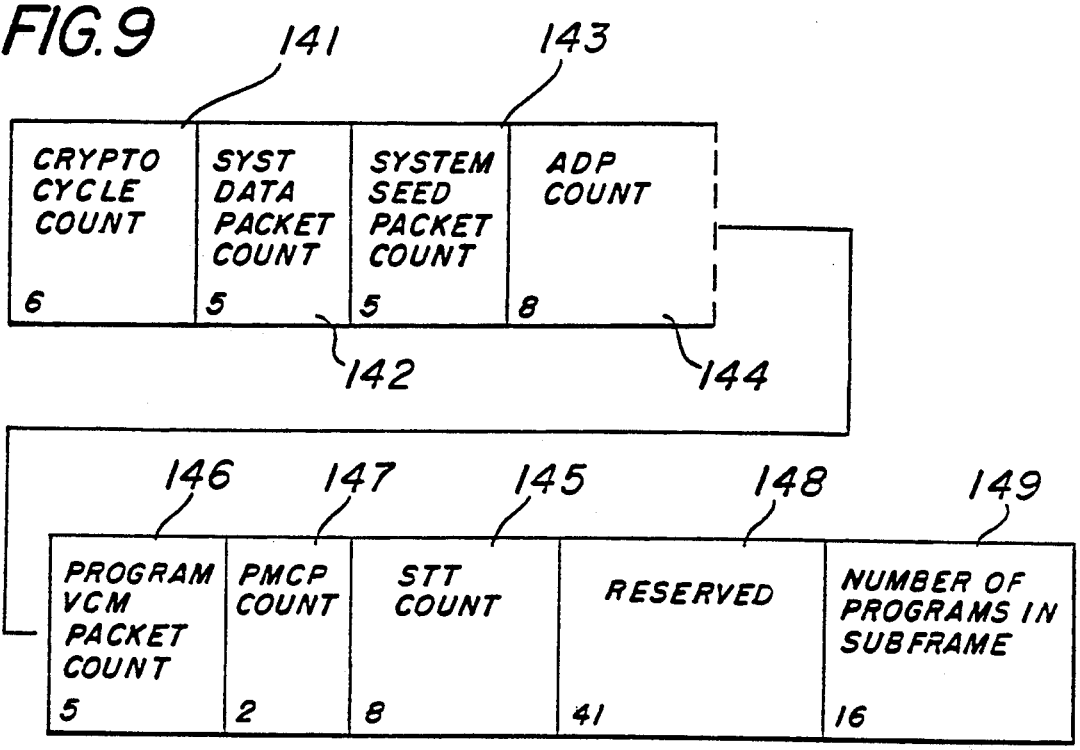
FIG. 9 shows in detail the general arrangement and contents of a subframe multiplex map in accordance with the present invention.

FIG. 9 illustrates the general arrangement and contents of a subframe multiplex map 110. As can be seen, the subframe multiplex map 110 (sometimes hereinafter referred to as the "subframe mux map") is preferably 96 bits long and comprises a number of fields. As explained, the subframe mux map 110 must be present in every subframe because it contains information regarding the contents and format of the rest of the subframe. Specifically, the subframe mux map 110 describes the layout and type of packets and data in the transport layer of each subframe. As described hereinafter in greater detail, subframe demultiplexers at each remote location interpret the subframe mux map 110 to determine how to extract the plurality of programs from a given subframe data stream 58 (FIG. 2). As those skilled in the art will appreciate, the subframe mux map 110 is critical to the functioning of the system of the present invention. Accordingly, the subframe mux map is transmitted unencrypted, and as shown in FIG. 8 at block 138, the subframe mux map 110 is heavily error protected using any well known forward error correction (FEC) technique suitable to the error characteristics of the particular transmission medium.

Referring again to FIG. 9, the subframe mux map includes a crypto-cycle count 141 that indicates which position in a cryptocycle that the particular subframe occupies. The crypto-cycle count 141 is necessary so that the decoders at remote locations know where the crypto-cycle boundaries occur. As mentioned above, the seeds used for encrypting various program services are changed at every cryptocycle boundary. An SDP count 142 specifies the number of SDPs (system data packets) present in the subframe. As described hereinafter, the SDPs provide other system related information to the decoders at remote locations. According to the present embodiment, a maximum of 32 SDPs are possible per subframe. A system seed packet count 143 specifies the number of packets n the transport layer that contain encryption seeds. An ADP count 144 specifies the number of addressable data packets in the subframe. In a "full-frame mode", the ADP count may specify that the entire subframe of the contains ADPs. Thus, ADPs may be extended throughout the entire subframe in place of all or some of the program data packets. A program virtual channel map packet (PVCMP) count 146 specifies the number of virtual channel map packets that are carried in a given subframe. Virtual channel maps are described hereinafter. A program multiplex control packet count 147 indicates the number of program multiplex control packets that are carried in the subframe. As described hereinafter, the program multiplex control packets specify the number of bits in each program data packet (PDP) that are allocated to each program input to the multiplexer 56. A system teletext count 145 indicates the number of system teletext packets in the subframe. System teletext packets (STTs) contain system related information that a system operator may wish to display to subscribers at the subscriber locations. For example, system teletext may contain a menu of "pay-per-view" choices available to the subscriber. As shown, 41 bits (field 148) in the subframe mux map 110 are reserved for future use. The subframe mux map 110 ends with a program count 149 that specifies the number of programs being multiplexed within the subframe. The general contents and arrangement of each of the packets carried in the transport layer will be described hereinafter.

As mentioned previously, the service seeds used to encrypt the individual services of various programs are transmitted to the remote locations in service seed packets (SSPs). Referring again to FIG. 8, the service seeds (from seed generator 54 of FIG. 2) are provided to an SDP/SSP builder 152 via subframe multiplexer input 153. The SDP/SSP builder 152 constructs the service seed packets (SSPs) that carry the individual service seeds. As mentioned, time is needed at remote locations to receive the seeds and process them in order to be ready to decrypt the incoming encrypted service data. Accordingly, the services seeds are transmitted to remote locations one cryptocycle in advance of the data the seeds were used to encrypt. This allows the decoder at each remote location enough time to have the seeds ready for the decryption process and avoids unnecessary buffering of the incoming multiplex data stream at the decoder. As shown in FIG. 8, subframe controller 130 further provides system related data to the SSP/SDP builder for constructing system data packets (SDPs). Because of the importance of service seeds and system related info, the SSPs and SDP are error protected using any well known forward error correction scheme (FEC) as shown at block 154. Details of the contents and arrangement of SSPs and SDPs are provided hereinafter. System teletext packets (STTs) are provided by the controller 130 directly to the subframe builder 150 via line 175.

Referring still to FIG. 8, each of the program data streams input to the subframe multiplexer 56 (e.g., programs $P_1, P_2 \ldots P_N$) are fed to a program multiplexer 156 which constructs the program data packets (PDPs) that are carried in the program data region of each subframe. The controller 130 feeds program multiplex control packets (PMCPs) to the program multiplexer 156 via line 157. The program multiplexer 156 allocates portions of each PDP to each program in accordance with the information contained in the PMCPs. The PMCPs are also error protected using any well known forward error correction scheme at block 158. The error coded PMCPs are fed to the subframe builder 150 where they are inserted into the transport layer of the appropriate subframe. As explained, the subframe multiplex map specifies where in each subframe the PMCPs are located. According to the method of the present invention, when a subframe is retrieved from a multiplex data stream at a remote location, a subframe demultiplexer in a decoder at that location extracts the subframe multiplex map from each subframe, determines the location of the PMCPs in the subframe transport layer, and employs the PMCP information to determine the program allocation in each PDP. In this manner, the programs can be extracted from successive subframes.

According to the present embodiment, up to six PMCPs may be transmitted with every subframe. Each PMCP specifies the allocation or "program weighting" for up to 10 programs. Thus, if no more than 10 programs are carried in a given subframe data stream, then only one PMCP is needed per subframe. If more than 10 programs are carried, however, additional PMCPs are needed. In the present embodiment, wherein each PDP is 60 bits wide, no more than 60 programs may be carried in a given subframe data stream (i.e., one bit of each PDP per program), and therefore, no more than six PMCPs are ever transmitted in a given subframe. Those skilled in the art will appreciate, however, that the system of the present invention does not have to be limited to 60 programs, and therefore, any number of programs and requisite PMCPs may be transmitted per subframe. However, to accommodate more than 60 programs, the width of each PDP must be enlarged.

Figure 10:
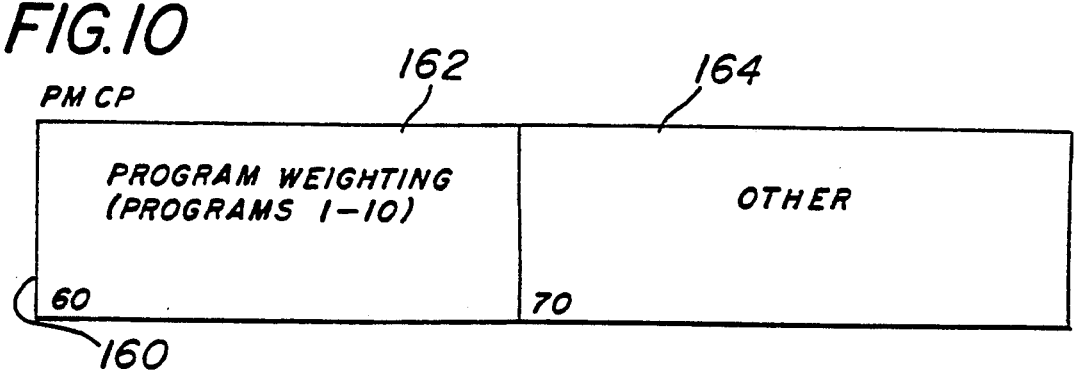
FIGS. 10 and 11 show in detail the general arrangement and contents of first and second program multiplex control packets that may be transmitted within a subframe in accordance with the method of the present invention.
Figure 11:
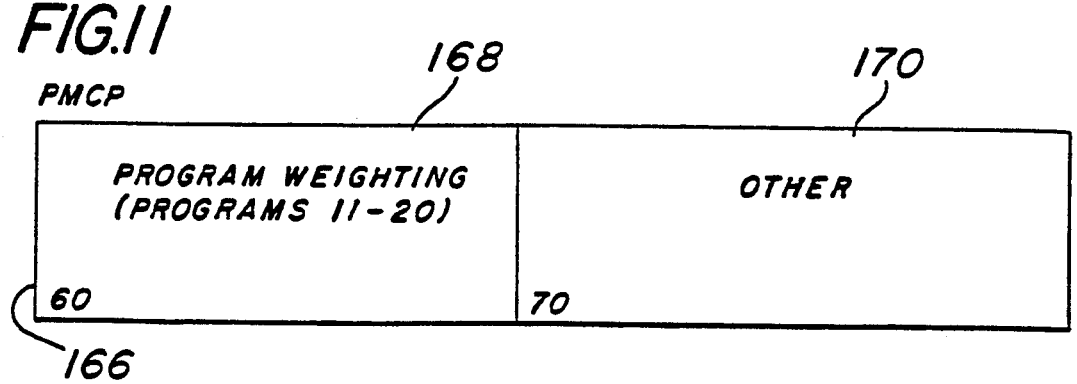

FIG. 10 shows the general arrangement and contents of a PMCP 160 that specifies the program weighting (i.e., allocation) for the first 10 programs carried in the subframe of the present example. As can be seen, the PMCP 160 contains a first data field 162 that specifies the program weighting. Each program (i.e., programs 1-10) is represented by a 6-bit descriptor that indicates how many bits of each program data packet (PDP) are allocated to that program. The first six bits of the program weighting field 162 of the PMCP 160 contain the descriptor for program 1, the second six bits contain the descriptor for program 2, and so on. An additional data field 164 is provided in the PMCP 160 for other program related information, as desired. FIG. 11 illustrates the contents of a second PMCP 166 required if more than 10 programs are to be carried in a subframe. The format of the second PMCP 166 is identical to that of the first PMCP 160 of FIG. 10, except that the program weighting field 168 and additional data field 170 provide program weighting and other information for programs 11 through 20. Successive PMCPs having the same format as the PMCPs of FIGS. 10 and 11 will be needed for each additional ten programs. As explained, the PMCPs are employed in the subframe multiplexers and subframe demultiplexers to facilitate insertion and extraction of individual programs from each subframe.

In accordance with the present invention, the program data packets (PDP) in each subframe may optionally be encrypted prior to insertion into the subframe. This additional encryption is referred to herein as a "global layer" of encryption. As shown in FIG. 8, PDPs are sent to an optional "global" encryptor 179. The global encryptor 179 may be functionally equivalent to the independent service encryptors 52 of FIG. 2. A global seed generator 177 generates the seed value used by the global encryptor 179 to encrypt the PDPs. As with the independent service seeds, in the preferred embodiment, the global seed is changed every cryptocycle, and the global seed used during a given cryptocycle is transmitted to remote locations one cryptocycle in advance of the PDP's that the seed is used to encrypt. According to the preferred embodiment, the global seeds are transmitted to remote locations in system data packets (SDPs). To this end, the global seed generator 179 provides the global seeds to the SDP/SSP builder 152 which inserts each global seed in a subframe system data packet (SDP) during the appropriate cryptocycle. As those skilled in the art will appreciate, although in the preferred embodiment the global seed is changed once every cryptocycle, the global seed may be changed at larger or shorter intervals if desired. For example, the global seed can be changed every subframe, in which case the global seed used to encrypt the PDPs in a given subframe must be transmitted one or more subframes in advance to give the decoder sufficient time to prepare for decryption.

Referring once again to FIG. 8, the subframe controller 130 generates one or more program virtual channel map packets (PVCMPs) in response to virtual channel map information supplied to the controller 130 via line 57 from the encoder's control computer 68 (FIG. 1). The program virtual channel map packets receive forward error correction (FEC) protection at block 173 and are then fed to the field builder 150. Details of the contents and arrangement of a program virtual channel map packet will be provided hereinafter. Basically, a program virtual channel map provides an associattion between a "virtual channel" selected by a subscriber and a program carried in a given subframe data stream. As described hereinafter in greater detail, when a subscriber selects a "virtual channel" for viewing, the subframe demultiplexer in a decoder at the subscriber location interprets the program virtual channel map to determine which program in a given subframe data stream corresponds to the selected virtual channel. As explained hereinafter in greater detail, once the decoder has determined from the program virtual channel map which program corresponds to the subscriber's selection, the demultiplexer interprets the program multiplex control packet (PMCP) in each incoming subframe to determine which bits in each program data packet (PDP) are allocated to that selected program. With this information, the subframe demultiplexer can then extract the selected program from each PDP.

As described hereinafter in greater detail, the control computer 130 may also provide subscriber specific information, known as "addressable data". This information is fed to an addressable data packet (ADP) builder 138 which constructs individual ADPs. An ADP contains a "public address" which acts as a "wake-up" call to a single target decoder in the system. ADPs carry subscriber specific information to individual subscribers. For example, an ADP may carry service authorization information which alerts a particular subscriber's decoder as to which services the subscriber has paid for. ADPs provide important information, and therefore, are error protected using a combination of FEC and CRC error codes as shown at block 176.

In addition to the various subframe transport layer packets (e.g., SDPs, SSPs, ADPs, PMCPs, PVCMPs and STTs) and program data packets (PDPs), the subframe builder also receives the SFSYNC word from an SFSYNC word generator 178. The SFSYNC word is generated the same for each subframe, but is bit-inverted every other subframe. Having received all the contents for a given subframe, subframe builder 150 interprets or "reads" the subframe multiplex map stored at block 134 and constructs each subframe of the subframe data stream according to the subframe mux map for that subframe. A clock generator 180 provides a clock signal to the field builder 150 to ensure that the individual blocks of each field are generated at the proper rate, which according to the preferred embodiment is dependent upon the rate, $F_{SF}$, at which superframes are transmitted. Once constructed, each successive subframe in the subframe data stream is fed to the encoder's superframe multiplexer 62 (FIG. 2) which, as explained previously, multiplexes a plurality of subframes within a superframe construct.

Figure 12:
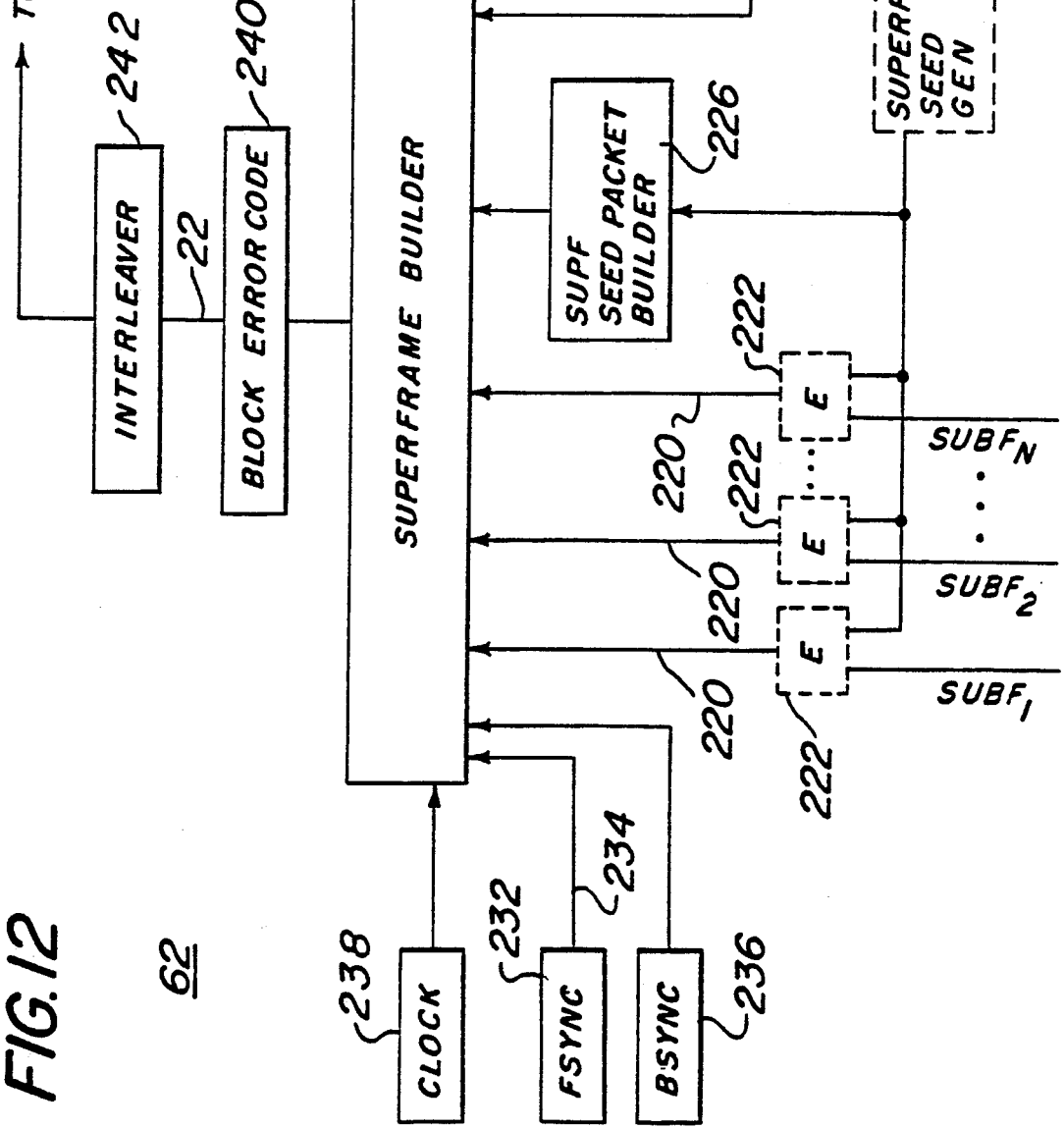
FIG. 12 is a block diagram of the superframe multiplexer employed in the encoder of FIG. 2 in accordance with the present invention.

FIG. 12 is a block diagram of a superframe multiplexer 62 in accordance with the present invention. The superframe multiplexer 62 operates in accordance with another aspect of the method of the present invention to multi-multiplex a plurality of subframe data streams to generate a multiplex data stream comprising a continuous sequence of superframes for transmission to remote locations. As shown in FIG. 12, therefore, a plurality of subframe data streams, $SubF_1 \ldots SubF_N$, are input to the superframe multiplexer 62. By way of example, these subframe data streams may be the subframe data streams 58 input to the superframe multiplexer 62 from each of the subframe multiplexers 56 of FIG. 2 (i.e., subframe multiplexers 1 ... N).

Like the subframe multiplexers 56, the superframe multiplexer 62 comprises a controller 200 that controls the overall operation of the superframe multiplexer 62. Various parameters are input to the controller 200 by the control computer 68 (FIG. 2) via line 69, such as how many subframes are input to the multiplexer 62. Subframe virtual channel map (SFVCM) information (described hereinafter) is also provided to the controller 200 via line 69. In response to this information, the controller 200 generates, for each superframe, a superframe map that is carried in the transport layer 86 of each superframe 66 (see FIG. 5). The superframe map 102, like its subframe counterpart, specifies the number and location of the superframe transport layer packets that follow in the superframe, as well as the size and location of each subframe carried in the superframe. As mentioned previously, the transport layer 86 of each superframe 66 contains subframe virtual channel map packets (described hereinafter) and optionally may contain a superframe encryption packet. Superframe maps are employed at remote locations to facilitate extraction of information from the respective superframes. Details of the contents and arrangement of the superframe map will be provided hereinafter.

To generate each superframe, the controller 200 feeds the superframe map for that superframe to a storage memory 202 via line 204. A superframe builder 206 "reads" the superframe map in order to construct the particular superframe being generated. As described previously, the superframe multiplex map is carried in the superframe at the beginning of the first block of the superframe following the block containing the FSYNC word (see FIGS. 2 and 5). Accordingly, the controller 200 also feeds the superframe multiplex map to the superframe builder 200, as shown.

Figure 13:
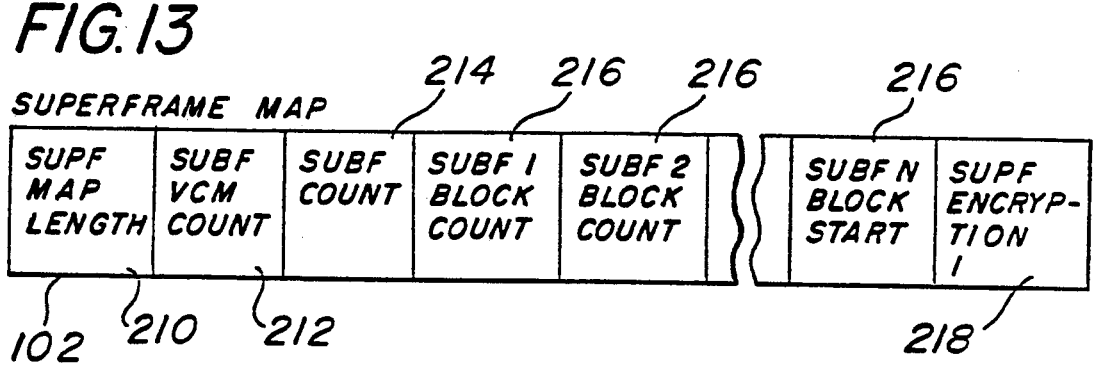
FIG. 13 shows in detail the general arrangement and contents of a superframe map in accordance with the present invention.

FIG. 13 shows the general arrangement and contents of a superframe map 102. As shown, the superframe map 102 includes a superframe map length field 210 that specifies the overall length, in bits, of the superframe map 102. As suggested by the length field 210, the length of the superframe map varies. The superframe map length field 210 is followed by a subframe Virtual channel map (SFVCM) count 212 that specifies the number of SFVCMs present in the superframe transport layer. Further details of the function and contents of a subframe virtual channel map (SFVCM) will be provided hereinafter. Basically, a subframe virtual channel map packet is functionally similar to a program virtual channel map. As described above, a program virtual channel map packet "maps" a subscriber's channel selection to a particular program carried in a given subframe. Because multiple subframes are carried within a given superframe, an additional mapping is needed to identify the particular subframe within the superframe that contains the program that relates to the subscriber's channel selection. The subframe virtual channel map packets provide this additional mapping. When a multiplex data stream is received at a decoder, the decoder must first examine the subframe virtual channel map to determine which subframe to extract, and then must examine the program virtual channel map in that subframe to determine which program in the subframe corresponds to the subscriber's channel selection. Further details of the contents and arrangement of the subframe virtual channel map packets (SFVCMs) and program virtual channel map packets (PVCMPs) will be provided hereinafter.

Referring still to FIG. 13, a subframe count 214 follows the SFVCM count 212. As the label suggests, the subframe count 214 specifies the number of subframes carried within the superframe. Following the subframe count 214 are a plurality of subframe starting block counts 216. One subframe starting block count 216 is needed for each subframe carried in the superframe. Consequently, the number of subframe starting block counts 216 will be equal to the value in the subframe count 214. Each subframe starting block count 216 specifies the block number in the superframe at which that subframe begins. This information is needed to facilitate extraction of the individual subframes from each superframe. As explained hereinafter in greater detail, when a superframe is received at a decoder, the decoder interprets the superframe map in order to determine the location of each subframe within the superframe. In particular, the decoder "reads" the subframe count field 214 of the superframe map, and then determines the starting block of each subframe from the subframe starting block fields 216 that follow. The subframe starting block fields 216 are followed by a single bit 218 that indicates whether the subframes within the superframe are optionally encrypted. Optional subframe encryption will be described hereinafter. As those skilled in the art will appreciate, the superframe map 102 transmitted with each superframe provides a means for altering the content of each superframe on a per frame basis.

Referring again to FIG. 12, according to the present invention, successive subframes of each subframe data stream (e.g. $SubF_1$, $SubF_2$ ... $SubF_N$) may be fed directly to the superframe builder 206 via input lines 220 for insertion into successive superframes. For each superframe, the superframe builder 206 will "read" the subframe start block fields 216 in the superframe map and insert a subframe from each subframe data stream in its specified location within the superframe. Thus, each superframe contains one subframe from each of the subframe data streams input to the superframe builder 206 via lines 220. As mentioned previously, however, the subframes may optionally be encrypted prior to insertion in a superframe. As shown with dashed lines in FIG. 12, therefore, the subframe data streams, e.g. $SubF_1$, $SubF_2$ ... $SubF_N$, may be fed to optional subframe encryptors 222 prior to being sent to the superframe builder 206. Functionally, the encryptors 222 may be identical the encryptors 52 of FIG. 2. As with the encryptors 52, the encryptors 222 each receive an encryption "seed" from a seed generator 224. When this optional subframe encryption is employed, the seeds used to encrypt each subframe must be transmitted to each remote location so that the subframes may be decrypted. As shown, therefore, the seeds are also provided to a superframe encryption seed packet builder 226 which generates a superframe encryption packet that contains the seeds. As mentioned previously, the superframe encryption packet is part of the superframe transport layer. Further details of the general contents and arrangement of a superframe encryption packet will be provided hereinafter. In one embodiment, the seeds used to encrypt each subframe data stream are changed every superframe. In this case, a superframe encryption packet is transmitted with every superframe. Those skilled in the art will appreciate, however, that the subframe encryption seeds may be changed at larger, fixed intervals, in which case a superframe encryption packet need only be transmitted at those intervals. Depending upon the number of subframes input to the superframe multiplexer, and therefore the number of seeds used, the superframe encryption packet may span more than one block of the superframe transport layer.

In addition to the superframe map, the superframe controller 200 also provides the superframe ID and any subframe virtual channel map packets (SFVCMs) to the superframe builder 206 via lines 228 and 230 respectively. The FSYNC word is generated at block 232 and fed to the superframe builder via line 234. The FSYNC word is generated similarly for each superframe, but is bit-inverted every other superframe. As mentioned, the FSYNC word is a 1432 bit pattern that statistically is very unlikely to occur randomly within a given multiplex data stream. BSYNC bytes are provided to the superframe builder 206 at block 236. A clock generator 238 provides a clock signal to ensure that superframes are output from the superframe builder 206 at the proper superframe rate, $F_{SF}$. Successive blocks of each superframe are then fed to a Reed-Solomon block error code generator that generates parity bits for each block of the superframe and inserts the generated parity bits (e.g., 20 bytes in the preferred embodiment) at the end of each block to arrive at the specified block length $L_B$, which in the preferred embodiment is 200 bytes.

Figure 12A:
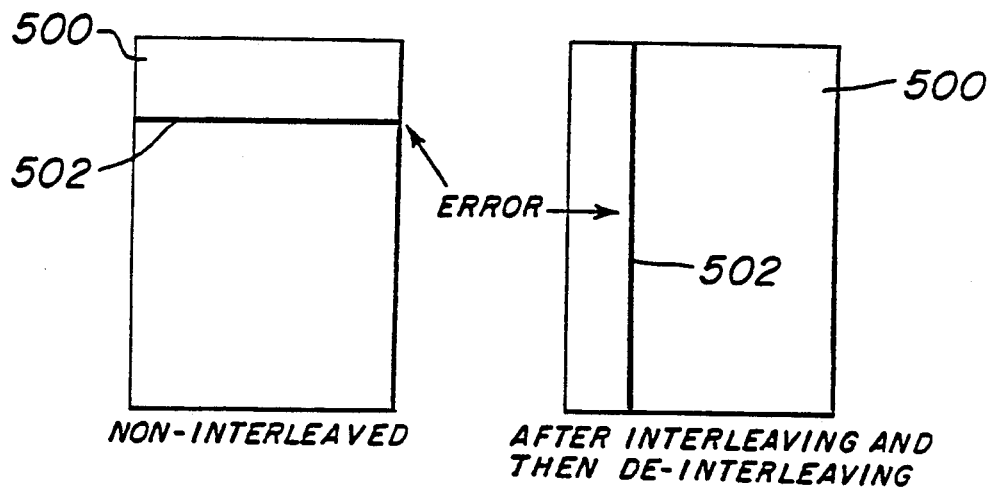
FIG 12(a) graphically illustrates the reduction of burst errors during the transmission of an exemplary superframe by interleaving portions of the superframe in accordance with an aspect of the present invention.

Successive superframes are output from the block error code generator 240 in a continuous sequence defining a multiplex data stream 22 (see FIGS. 1 and 2) that is to be transmitted to remote locations. According to the preferred embodiment, however, portions of each superframe in the multiplex data stream 22 may be transmitted in an interleaved fashion. As shown in FIG. 12, the multiplex data stream 22 is passed through an interleaver 242 that interleaves portions of each superframe in the multiplex data stream prior to transmission. As those skilled in the art know, an interleave buffer must be provided in the interleaver 242 for temporarily storing each successive superframe so that interleaving can be performed with that superframe. In the preferred embodiment, all of the data in each superframe, except the block containing the FSYNC word (i.e., the first block) and the BSYNC byte at the beginning of every other block, are transmitted in an interleaved manner. By interleaving the data, burst error protection increases linearly by a factor equal to the number of blocks that are interleaved. FIG. 12(a) illustrates the advantages of interleaving. Without interleaving, an exemplary superframe 500 of the multiplex data stream may encounter a burst error 502 that corrupts an entire block in the superframe 500. The Reed-Solomon error coding performed on each block is incapable of correcting such a large number of corrupted bits. By transmitting at least portions of the superframe in an interleaved manner and then de-interleaving at each remote location, that burst error 502 is spread "vertically" over multiple blocks in the superframe 500, as shown. Thus, only a single bit in each block is corrupted. As those skilled in the art know, the Reed-Solomon error code applied to each block is very capable of correcting a single bit error in a given block of the superframe.

As briefly described before, and as best shown in FIG. 1, the multiplex data stream 22 generated by each encoder 16 in the manner described above (portions of which have been interleaved) is fed to a respective transmitter 18 for transmission to a plurality of remote locations in the system. A remote location may be a DBS subscriber, cable head-end installation or a cable subscriber. In the example shown in FIG. 1, the multiplex data stream 22 generated by programmer A and the multiplex data stream 22' generated by programmer B are both transmitted via satellite 23 to a cable head-end installation 25. As those skilled in the art will appreciate, the multiplex data streams generated by each programmer, e.g. streams 22 and 22', must be modulated prior to transmission via satellite. Typically, each programmer modulates its multiplex data stream on a unique frequency for transmission over a single satellite transponder operating at that frequency. At the remote locations, receivers are needed to receive the multiplex data streams and demodulate them. For example, the receivers 26 of the cable head-end installation 25 demodulate respective ones of the multiplex data streams received from each programmer in the system. As explained before, there may be any number of programmers in the system 10, and therefore, a plurality of multiplex data streams will be received at the cable head-end 25. In the example shown, multiplex data stream 22 is being received by receiver A and multiplex data stream 22' is being received by receiver B.

As explained earlier, each received multiplex data stream is fed from its respective receiver 26 to a modulator 28, where in the preferred embodiment, it is modulated on a distinct 6 MHz channel. Each of the modulated multiplex data streams is then provided to a combiner 30 that combines the individual 6 Mhz channels into a single wide-band signal that is then transmitted via a cable distribution network 32 to a plurality of cable subscriber locations, e.g. 34 and 34'. Each subscriber location 34, 34' has a decoder 36 that functions, as described hereinafter, to extract a selected program (and the digital services therein) from a selected one of the multiplex data streams for display on a television set 38 or output to an audio device 40.

Figure 14:
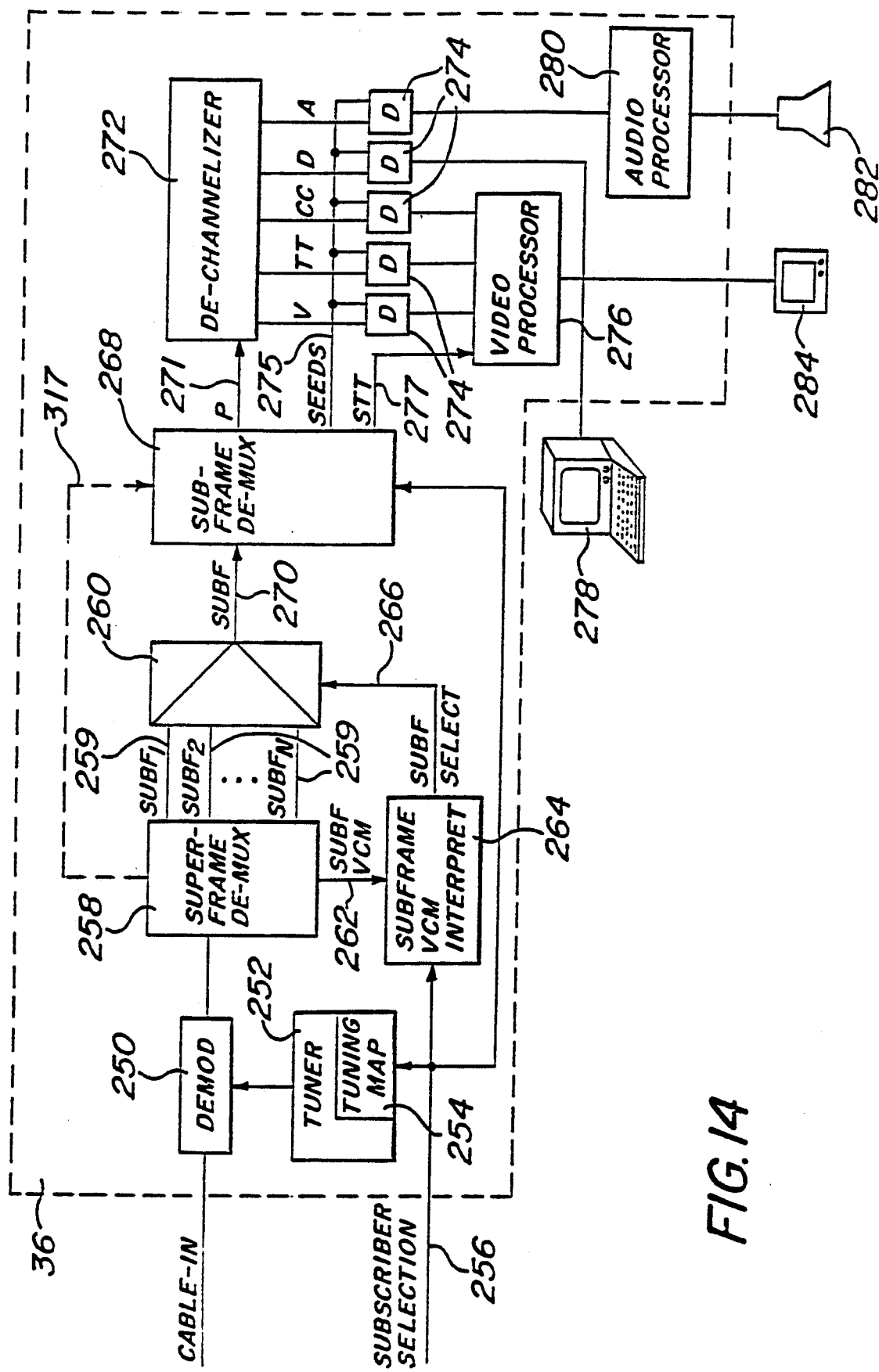
FIG. 14 is a detailed block diagram of a decoder apparatus that may be employed at remote locations in accordance with the system and method of the present invention.

FIG. 14 shows a detailed block diagram of the decoder 36 of FIG. 1. As shown, the decoders 36 comprise a demodulator 250 for demodulating incoming multiplex data streams. A tuner 252 provides the demodulator 250 with the appropriate carrier frequency signal for demodulating a selected multiplex data stream. Recall from FIG. 1 that each multiplex data stream received at the cable head-end installation 25 is modulated on a unique 6 MHz channel. When a subscriber selects a television channel (i.e. a program with its video, audio and other related services), the selection is input via line 256 to a tuning map 254 stored within the tuner 252. The tuning map 254 "maps" the subscribers selection to the multiplex data stream that carries the selected program services. The tuner 252 then supplies the demodulator 250 with the appropriate carrier frequency for demodulating that multiplex data stream. Thus, in response to a subscriber's selection, the decoder 36 "tunes" to the appropriate 6 MHz cable channel that contains the multiplex data stream within which the selected program is carried. Once the appropriate multiplex data stream has been received and demodulated it is fed to a superframe demultiplexer 258 that operates in accordance with the method of the present invention to extract the individual subframes from each incoming superframe of the multiplex data stream. Details of the superframe demultiplexer 258 are provided hereinafter.

As shown, the superframe demultiplexer 258 outputs the extracted subframe data streams (e.g., SubF$_1$, SubF$_2$ ... SubF$_N$) on lines 259 and sends each subframe data stream to a respective input of an N-to-1 data multiplexer 260. The superframe demultiplexer 258 also extracts any subframe virtual channel map packets carried in the transport layer of various superframes and feeds the subframe virtual channel map packets to a subframe VCM interpreter 264 via line 262. Details of the arrangment and contents of a subframe virtual channel map packet will be provided hereinafter. Subscriber selections are also fed to the subframe VCM interpreter 264, as shown. As those skilled in the art understand, a subscriber's selection is in the form of a "virtual channel." To the subscriber, a "virtual channel" is simply the channel number displayed on the set-top decoder attached to the subscriber's television or displayed using a graphical user interface or some other device at the subscriber location. The subframe VCM interpreter 264 receives the subscriber's "virtual channel" selection and interprets the subframe virtual channel map to determine which subframe data stream (e.g., SubF$_1$ ... SubF$_N$) contains the program that is associated with that subscriber's virtual channel selection. For example, a subscriber may select "channel 12" on the subscriber's decoder. The subframe virtual channel map may indicate that "channel 12" corresponds to a program that is carried in "subframe data stream 2" (i.e., SubF$_2$). Once the subframe VCM interpreter 264 has determined which subframe contains the program associated with the subscriber's "virtual channel" selection, the interpreter 264 provides an appropriate selector signal to the N-to-1 multiplexer 260 via line 266. In response, the N-to-1 multiplexer 260 provides the selected subframe data stream to a subframe demultiplexer 268 via line 270. Details of the subframe demultiplexer 268 are provided hereinafter.

Essentially, the subframe demultiplexer 268 operates in accordance with the method of the present invention to extract the particular program associated with the subscriber's "virtual channel" selection from the selected subframe data stream. As mentioned previously, a program virtual channel map is carried in each individual subframe data stream that provides the additional "mapping" between the subscriber's channel selection and the program associated with that selection. As will be described hereinafter, the subframe demultiplexer 268 interprets the program virtual channel map in order to determine which program is associated with the subscriber's "virtual channel" selection. Consequently, the subframe demultiplexer 268, must also be provided with the subscriber's "virtual channel" selection, as shown. As those skilled in the art will appreciate, the "tuning map" and virtual channel map mechanisms of the present invention implement a three-level mapping scheme; the tuning map 254 stored in each decoder directs the decoder to the appropriate multiplex data stream, the subframe virtual channel map directs the decoder to the appropriate subframe data stream within that multiplex data stream, and the program virtual channel map directs the decoder to the appropriate program within that subframe data stream.

As explained above, the individual subframes of a subframe data stream may or may not contain an SFSYNC word to provide a means for achieving subframe synchronization at the decoder. When SFSYNC words are not employed, the superframe demultiplexer 258 must provide a subframe synchronization signal to the subframe demultiplexer 268 via line 317, as described hereinafter.

Once the selected program has been extracted from the subframe data stream by the subframe demultiplexer 268, it is fed to a de-channelizer 272 via line 271. As explained previously, program data streams contain a plurality of related digital services, such as video, audio, teletext, closed-captioning and other data services, that are combined at an encoder according to some protocol. In the preferred embodiment, the services are combined at the encoder in accordance with the Motion Picture Expert Group's (MPEG) systems level protocol (ISO 11172) which specifies a synchronized packet syntax for combining multiple digital services. The de-channelizer 272 operates in accordance with this protocol to extract and separate the individual digital services combined within the selected program data stream.

The decoder 36 has been described herein as selecting a single subframe data stream and providing that subframe data stream to the subframe demultiplexer 268 for extraction of a selected program. In accordance with another embodiment, the decoder 36 may, in addition to decoding one selected subframe data stream, pass one or more of the other subframe data streams to various digital output ports (not shown) at the same time that it is decoding the selected subframe data stream.

As mentioned previously, the individual services within a given program data stream may be encrypted at the encoder. Consequently, the decoder 36 further comprises a plurality of decryptors 274 for decrypting any encrypted services. As mentioned previously, the encryption seeds used at the encoder to uniquely encrypt each service are carried in service seed packets (SSPs) within the transport layer of various subframes in the subframe data stream. As described hereinafter in greater detail, the subframe multiplexer 268 retrieves the seeds from each SSP and provides the seeds to each decryptor 274 via line 275. Also, the seeds used to encrypt each service are changed every cryptocycle, and the seeds used to encrypt each service over a given cryptocycle are transmitted one cryptocycle in advance so that the decoder 36 has sufficient time to retreive the seeds and provide them to the decryptors 274. It is important to note, however, that the individual services are not required to be encrypted and may be transmitted unencrypted if desired.

Still referring to FIG. 14, after decryption (if necessary) video related services, such as video services, associated closed-captioning data, and teletext data are fed to a video processor 276 which converts the digital video service information back into an appropriate analog video format, such as NTSC or PAL, for display on a television set 284 at the subscriber location. Additionally, the subframe demultiplexer 268 outputs system teletext to the video processor 276 via line 277 for display on the television set 284. The processor 276 may additionally provide digital video decompression if, for example, one or more of the video services were compressed at the encoder prior to transmission. According to the invention, the video processor 276 of each decoder 280 employs standard analog devices for generating analog video signals. The particular devices employed depend upon whether the system is being used to generate PAL video, NTSC video or some other format. The "other data" (D) of a given program may be output directly to a digital computer 278 at the subscriber location. An audio processor 280 is provided for converting any digital audio services to analog format for output to a speaker device 282. As mentioned previously, there are many digital and analog audio formats in use throughout the industry, and the present invention is not limited to any one format. Accordingly, the function of the encoders 16 and decoders 36 in the system of the present invention is not dependent upon the particular audio format being used. For example, the system may use the SEDAT-1 audio format, or any other format. As with the video processor 276, the audio processor 280 may additionally provide digital audio decompression if required.

As those skilled in the art understand, the foregoing description of decoder 36 is presented in the context of a cable television system. In a DBS (direct broadcast satellite) subscription television system, wherein a subscriber has a direct satellite down-link, a decoder employed at the DBS subscriber location may function similarly to the decoders 36 described above. A difference, however, is that in a DBS decoder, the tuner 252 "tunes" to a particular satellite transponder rather than a particular 6 MHz cable channel. Recall from FIG. 1 that each programmer transmits a multiplex data stream over a unique transponder. Thus, in DBS applications, a decoder must "tune" to a particular transponder frequency in order to receive and demodulate the appropriate multiplex data stream carrying the program services that a subscriber has selected.

Figure 15:
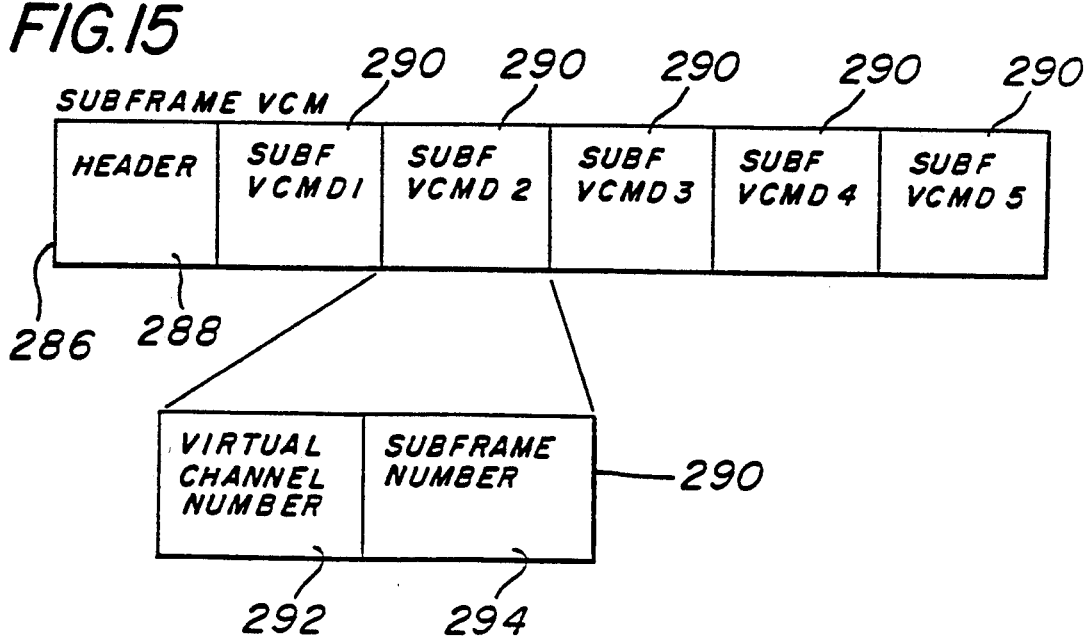
FIG. 15 shows in detail the general arrangement and contents of a subframe virtual channel map packet in accordance with the present invention.

FIG. 15 shows the general arrangment and contents of a subframe virtual channel map packet. As explained above, the subframe virtual channel map associates a subscriber's "virtual channel" with the subframe data stream that contains the program associated with that selection. A decoder 36 at the subscriber location interprets the subframe virtual channel map to determine which subframe contains the selected program. As shown in FIG. 15, a subframe virtual channel map packet 286 comprises a header 288, which identifies the packet as a subframe VCM packet, followed by a plurality of subframe virtual channel map definitions 290. In the preferred embodiment, a single subframe VCM packet, such as packet 286, contains up to five subframe virtual channel definitions 290 (labeled SubF VCMD1 . . . SubF VCMD5). Multiple subframe VCM packets may be employed as needed depending upon the number of subframes within a given superframe. As shown, each subframe virtual channel definition comprises a channel number field 292 that specifies the particular virtual channel number being defined, i.e., the number that a subscriber would select at the subscriber location. Next, a subframe number field 294 specifies which subframe data stream in the multiplex data stream carries the program that corresponds to that virtual channel number 292. Those skilled in the art will appreciate that this approach limits the amount of storage needed in the decoder and permits dynamic remapping of the superframe which is useful for subframe re-routing as described hereinafter.

FIG. 16 is a detailed block diagram of a superframe demultiplexer 258 in accordance with the present invention. As shown, the superframe demultiplexer 258 receives an incoming multiplex data stream (i.e., a continuous sequence of superframes) that first passes through a de-interleaver 300 which de-interleaves those portions of each superframe that are transmitted in an interleaved format. As those skilled in the art will understand, the de-interleaver 300 must include a de-interleave buffer for temporarily storing successive incoming superframes in order for de-interleaving of those superframes to be performed. Next, a synchronizer 302 establishes frame synchronization. In accordance with the method of the present invention, frame synchronization is established using a two-level syncing strategy. First, the synchronizer 302 searches for a repeating BSYNC pattern within the multiplex data stream. Although the BSYNC byte transmitted at the beginning of every block in a superframe is a unique bit pattern, it is statistically likely to appear within other portions of the multiplex data stream. Its recurrence at precise block intervals, however, is very unlikely. Therefore, upon detecting a first BSYNC pattern, the synchronizer 302 determines whether another BSYNC pattern exists exactly 200 bytes later (i.e., the next block of the superframe). After detecting a pre-determined number of repeating BSYNC patterns at the appropriate block intervals, the synchronizer 302 assumes it has established block synchronization. Next, the synchronizer 302 searches for the FSYNC pattern in order to complete the frame synchronization process. Finding an FSYNC word is much easier once the synchronizer 302 has established BSYNC, because the FSYNC word in the first block of a superframe immediately follows the BSYNC byte for that block. Thus, the synchronizer 302 simply examines the bits that follow each BSYNC until it finds an FSYNC pattern. As mentioned above, the unique FSYNC pattern is much longer (179 bytes in the preferred embodiment) than the BSYNC patterns. Statistically, the FSYNC pattern is very unlikely to occur randomly in a multiplex data stream. As those skilled in the art will appreciate, the two-level syncing approach used herein speeds frame synchronization.

Once frame synchronization has been established, the multiplex data stream passes through error correction circuitry 304. As explained above, each of the blocks of each superframe are error coded. In the preferred embodiment, a Reed-Solomon code is employed. In particular, twenty (20) Reed-Solomon parity bytes are transmitted at the end of each block. The error correction circuitry 304 examines the parity bytes to determine if any errors have occurred in transmission and corrects the errors, if possible, in accordance with the Reed-Solomon error correction algorithm. If an uncorrectable error occurs, the error correction circuitry 324 provides an error signal.

The superframes of the multiplex data stream are processed one at a time in the sequence that they are received. After detecting and correcting any bit errors, the superframe map for an incoming superframe is extracted at block 306. The superframe map is temporarily stored in a memory 308 for use by various other parts of the demultiplexer 258, as explained hereinafter. Once the multiplex map has been extracted and stored, the incoming frame is passed to both a subframe extractor 312 and superframe transport layer extractor 310. The superframe transport layer extractor 310 interprets the superframe map to determine the number, type, and location of the transport layer packets in the superframe under consideration. As described previously, the superframe transport layer may contain a number of subframe VCM packets and/or a superframe encryption packet. The transport layer extractor 310 outputs the extracted subframe VCM packets via line 311. If the optional subframe encryption (described above) is employed at the encoder, then the extractor 310 also extracts any subframe encryption seed packet from the transport layer. As mentioned previously, encryption seeds may be changed at the encoder every superframe, in which case every superframe transport layer will contain an encryption seed packet, or the seeds may be changed at larger, fixed intervals, in which case a superframe encryption seed packet will only be transmitted at those intervals. Once the seed packet has been extracted, the transport layer extractor 310 provides the seeds to respective subframe decryptors 314. The subframe decryptors 314 function similarly to the service decryptors 274 in the decoder 36.

The subframe extractor 312, like the superframe transport layer extractor 310, interprets the superframe map to determine the location of each subframe within the superframe. In particular, the extractor 312 examines the subframe count field of the superframe map to determine how many subframes are contained within the superframe, and then examines the subframe starting block fields to determine the location of each subframe within the superframe. Once the location of each subframe has been determined, the extractor 312 outputs each subframe on a respective line 315. As mentioned, subframes may be encrypted at the decoder, and therefore, each subframe is passed to a respective decryptor 314. The decrypted subframes are then each output via respective lines 259. This process occurs repeatedly for each incoming superframe, and therefore, each line 259 outputs the successive subframes of a respective subframe data stream. As described above, in a decoder, each subframe data stream (e.g., $SubF_1 \ldots SubF_2$) is fed to the N-to-1 multiplexer 260. As shown, the subframe extractor 312 may also output a subframe synchronization signal via line 317 for the case where SFSYNC words are not employed at the beginning of each subframe.

FIG. 17 shows the general arrangement and contents of a superframe encryption seed packet 320. Since the number of subframe data streams carried in a multiplex data stream can vary, it is necessary to provide flexibility in the transmission of the subframe encryption seeds. To this end, the superframe seed packet 320 contains a header 322, identifying the packet as a seed packet, followed by a subframe count field 324 that indicates the number of subframe data streams carried in the multiplex data stream (i.e., how many subframes in each superframe). With this information, the superframe demultiplexer in a given decoder knows how many subframe encryption seeds will follow. After the subframe count field 324, the remainder of the packet 320 contains a number of consecutive fields 326 that contain the actual seed values. As shown, the seeds are simply provided consecutively by subframe number. It should be noted that alternate seed generation methods may be used to reduce the overall amount of encryption related information that must be transmitted in the superframe encryption seed packet. To accomplish this, however, a new packet format and header would have to be used. However, those skilled in the art will appreciate that the general arrangment and contents of any packet described herein may be modified without deviating from the true spirit and scope of the present invention as defined by the appended claims.

FIG. 18 is a detailed block diagram of a subframe demultiplexer 268, such as the subframe demultiplexer 268 of FIG. 14, in accordance with the present invention. The subframe demultiplexer 268 receives a subframe data stream at an input 330. A subframe synchronizer 332 may be used to detect SFSYNC words at the beginning of each successive subframe in the incoming subframe data stream in order to achieve subframe synchronization. Subframe syncrhonization is necessary so that the demultiplexer 268 can locate the subframe multiplex map in each incoming subframe. Recall, however, that the SFSYNC words are optional. As mentioned above, when SFSYNC signals are not employed, a subframe synchronization signal is supplied by the superframe demultiplexer 258 via line 317. As shown, in FIG. 18, therefore, line 317 is fed directly to the subframe multiplex map extractor 334.

Once synchronization is established (either via synchronizer 332 or via line 317) the subframe data stream is passed to block 334 where the subframe multiplex map for each subframe in the subframe data stream is extracted. Each of the subframes of the subframe data stream are processed one at a time in the sequence that they are received. When a subframe is received, the subframe multiplex map for that subframe is temporarily stored in a memory 336 for use by various other parts of the demultiplexer 268.

Once the subframe multiplex map has been extracted and stored, the subframe data stream passes to a transport layer/program data packet separator 338. The separator 338 "reads" the multiplex map for a given subframe to determine where the transport layer packets and program data packets (PDPs) are located within the subframe. The program data packets (PDPs) of each subframe are separated from the transport layer packets and output by the separator 338 via line 342. The transport layer packets (e.g., SDPs, SSPs, ADPs, PMCPs, STTs and PVCMPs) are passed to a transport layer demultiplexer 344 that also "reads" the subframe multiplex map in order to determine the exact number and location of the individual packets in the transport layer, and then provides each packet to various other parts of the subframe demultiplexer 268.

As shown in FIG. 18, the transport layer demultiplexer 344 passes system data packets (SDPs) and service seed packets (SSPs) directly to a control microprocessor 346 via line 345. The control microprocessor 346 extracts the service seeds and/or global seeds from the SSPs and SDPs, respectively. Other system related data is extracted from Various SDPs as well. As explained above, the service seeds used to encrypt service data during a given cryptocycle, as well as the global seeds used to encrypt PDPs, are carried in the SSPs and SDPs of the previous cryptocycle so that the demultiplexer 268 has sufficient time to prepare for decryption.

Program data packets (PDPs) output by the separator 338 via line 342 are provided to a global decryptor 335. As explained above, the global layer of encryption is optional in the system of the present invention, and therefore, the global decryptor 335 may not be provided. In the case where global encryption is employed, however, the control microprocessor 346 provides global seeds to the decryptor 335 for decrypting the globally encrypted program data packets. Once the global layer of encryption has been removed by the global decryptor 335, the decrypted PDPs are passed to a program extractor 348 where the data of a selected program is extracted from each PDP in accordance with the method of the present invention.

Addressable data packets (ADPs) are passed from the transport layer demultiplexer 344 to an address decoder 350. As briefly mentioned before, the decoders provided to each subscriber (e.g. decoder 36 of FIG. 14) contain a unique public address that is stored in the decoder during manufacture. As described hereinafter, addressable data packets have an address field for inserting a given decoder's unique public address. The address decoder 350 in the subframe demultiplexer 268 of a given decoder examines the address field of every incoming ADP to determine if a given ADP is "addressed" to that decoder. If so, the address decoder 350 passes the ADP to the control microprocessor 346 which extracts the information from the ADP and responds accordingly. An addressable data packet may contain various subscriber specific information, such as, for example, program authorization information that informs the subframe demultiplexer 268 which programs the subscriber has paid for. If a subscriber tunes to a "channel" that has not been paid for, the control micro-processor 346 will be able to "block" access to that program; the control microprocessor 346 may have security features built-in, or may pass information to a security element within the decoder. With ADPs, therefore, a cable operator is able to maintain individual control over the decoders installed throughout the system. Further details of the general arrangement and contents of an ADP will be provided hereinafter.

System teletext packets are provided by the transport layer demultiplexer 344 to the control micrprocessor 346 via line 347. The control microprocessor retrieves the system teletext data from each STT and formats the data for output via line 277 to the video processor 276 in the decoder 36. Alternatively, the system teletext data may be output to a computer display terminal (not shown).

According to the method of the present invention, the program virtual channel map packets (PVCMPs) are extracted from the transport layer by the transport layer demultiplexer 344 and provided to a program virtual channel map interpreter 352. A subscriber's "virtual channel" selection is also provided to the program VCM interpreter 352 via line 256 (see FIG. 14). As explained above, the subscriber's selection is in the form of a "virtual channel." To the subscriber, a "virtual channel" is simply the channel number displayed on the set-top decoder attached to the subscriber's television or displayed using a graphical user interface or some other device at the subscriber location. The program VCM interpreter 352 receives the subscriber's "virtual channel" selection, and interprets the virtual channel map to determine which program in the subframe data stream is associated with that subscriber's virtual channel selection. As can be seen, the program VCM interpreter 352 functions similarly to the subframe VCM interpreter 264 of FIG. 14. As those skilled in the art will appreciate, with the virtual channel mapping scheme of the present invention, a system operator can redefine the programs associated with various virtual channel by simply modifying the subframe virtual channel maps and program virtual channel maps.

Once the program VCM interpreter 352 has determined which program in the subframe data stream is associated with the subscriber's channel selection, it provides a program ID for that program to the program extractor 348. For example, a subscriber may select "channel 12" on the subscriber's television. The program virtual channel map may indicate that "channel 12" corresponds to program 3. This information is transmitted in the form of a program ID to the program extractor 348 via line 353.

To facilitate extraction of the appropriate program's data, the program extractor 348 receives the program multiplex control packets (PMCPs) for the current subframe via line 355. As explained above, the PMCPs specify which bits in each program data packet (PDP)

are allocated to each program. Thus, having received the program ID from the program VCM interpreter 352 and the PMCPs, the program extractor 348 is able to extract the bits for that program from each PDP in the current subframe. The extracted program data (i.e., program data stream) is then output via line 356. Recall from FIG. 14 that the extracted program data stream is then sent to a de-channelizer 272 where, as explained above, the individual services combined within the program data stream are extracted.

Figure 19A:
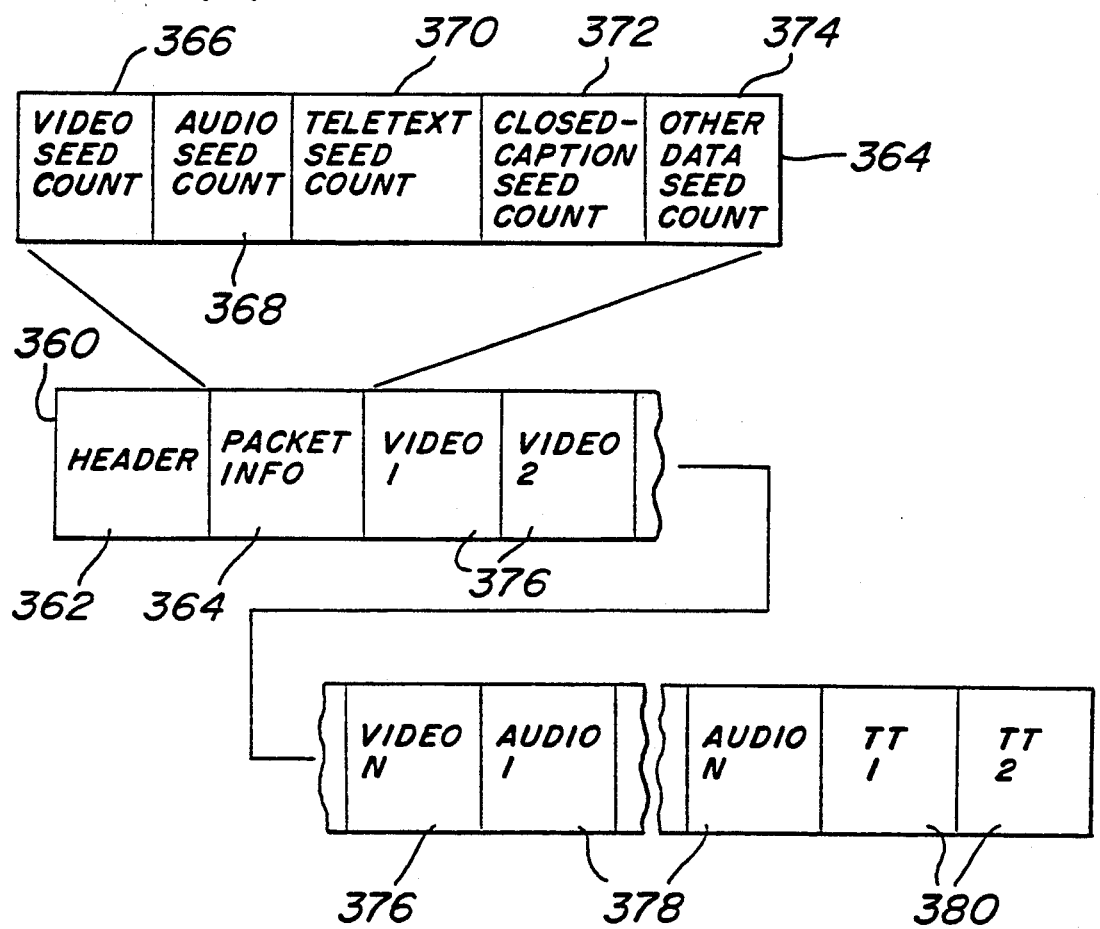
FIG. 19(a) shows in detail the general arrangement and contents of an exemplary first service seed packet that may be transmitted in a subframe.

Still referring to FIG. 18, the service encryption seeds, which are retrieved from the SSPs by the control microprocessor 346, are output from the subframe demultiplexer 268 via line 358 to the service decryptors 274 of FIG. 14. FIG. 19(a) shows the general arrangement and contents of a first service seed packet (SSP) 360 that must be transmitted in a given cryptocycle of a subframe data stream. As briefly described above, the individual service seeds used to encrypt the services of various programs during each cryptocycle are transmitted to subscriber locations so that the decoders at these locations can decrypt the extracted services. Furthermore, the seeds used to encrypt service data in the subframes of a given cryptocycle are transmitted one cryptocycle in advance of the encrypted service data so that the decoders have enough time to extract the seeds and prepare for decryption. In the preferred embodiment described herein, video (V), audio (A), teletext (TT), closed-captioning (CC) and other data services (D) may be encrypted.

As mentioned, FIG. 19(a) illustrates the arrangement and contents of a first SSP that must be transmitted during a given cryptocycle. Since the number of services carried in a subframe data stream can vary, it is necessary to provide flexibility in the transmission of the service seeds. To this end, the first SSP 360 in a given cryptocycle contains a header 362, identifying the packet as a service seed packet, and a packet information field 364 that contains information concerning the number of seeds to follow. As shown, the packet information field 364 contains a count for each type of service carried in the subframe data stream. As described above, a different seed is used to encrypt each service. Essentially, therefore, the seed packet header 364 specifies the number of each type of service carried in a given subframe data stream. For example, a video seed count 366 provides a count of the number of video services carried in the subframe data stream. With this information, a decoder knows how many video service seeds will follow. Similarly, an audio seed count 368 indicates the number of audio service seeds to follow, and so on. Count fields 370, 372 and 374 provide counts for the teletext, closed-captioning and "other data" services, respectively.

Figure 19B:
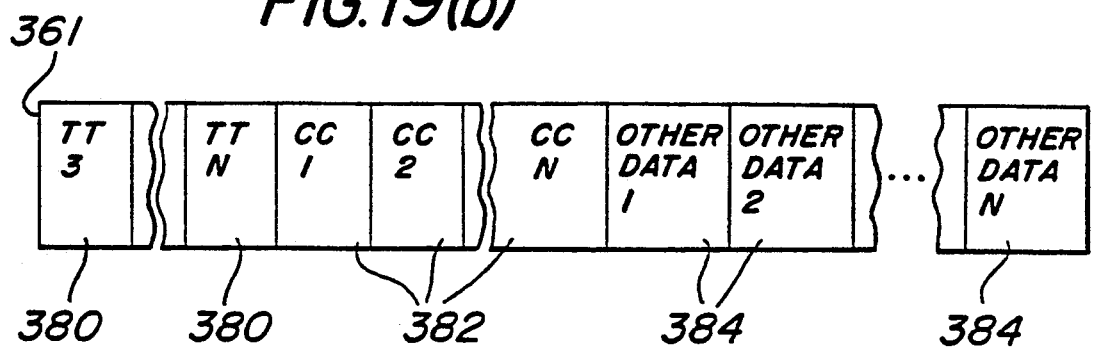
FIG. 19(b) shows in detail the general arrangement and contents of an exemplary service seed packet that may be transmitted subsequent to the service seed packet shown in FIG. 19 (a)

After the packet information field 364, the remainder of the first packet 360 contains the actual seed values. As shown, the seeds are simply provided consecutively by service type. If all the required seeds do not fit within the first seed packet, another seed packet may be provided after the first seed packet 360. FIG. 19(b) illustrates an exemplary seed packet 361 that would follow on the next line of a given field of the multiplex and would carry the remainder of the seeds. In the examples shown in FIGS. 19(a) and 19(b), video seeds are indicated at 376, audio seeds at 378, teletext seeds at 380, closed-captioning seeds at 382 and other data (D) seeds at 384. Additional SSPs may be transmitted as needed until all the seeds required for service decryption have been transmitted. As those skilled in the art will appreciate, because only one program is ever de-channelized at one time (as shown in FIG. 14), the control microprocessor 346 in the subframe demultiplexer 268 must determine which seeds in the incoming SSPs correspond to the services of that program. Once those seeds are identified, the control microprocessor need only output those seeds to the decryptors 274 of FIG. 14. It should be noted further that alternate seed generation methods may be used to reduce the overall amount of encryption related information that must be transmitted in the SSPs. To accomplish this, however, a new SSP format and header would have to be used. However, those skilled in the art will appreciate that the general arrangment and contents of any packet described herein may be modified without deviating from the true spirit and scope of the present invention as defined by the appended claims.

FIG. 20 shows the general arrangement and contents of a program virtual channel map packet. As explained above, the program virtual channel map associates a subscriber's "virtual channel" selection with a given program in a given subframe data stream. The subframe demultiplexer 268 in the decoder 36 at the subscriber location interprets the program virtual channel map to determine which program to extract from the subframe data stream. As shown in FIG. 20, a program virtual channel map packet 390 comprises a header 392, which identifies the packet as a program VCM packet, followed by a plurality of program virtual channel map definitions 394. In the preferred embodiment, a single program VCM packet, such as packet 390, contains up to five program virtual channel definitions 394 (labeled PVCMD1 . . . PVCMD5). Multiple program VCM packets may be employed as needed depending upon the number of programs within a given subframe data stream. As shown, each program virtual channel definition comprises a channel number field 396 that specifies the particular virtual channel number being defined, i.e., the number that a subscriber would select at the subscriber location. Next, a program number field 398 specifies which program in the subframe data stream corresponds to that virtual channel number. As those skilled in the art will readily appreciate, the content and arrangement of the program virtual channel map packet 390 is similar to that of the subframe virtual channel map packet 286 of FIG. 15.

FIG. 21 shows the general arrangement and contents of an exemplary addressable data packet 400 (ADP). The small number in the lower left corner of each packet field indicates how many bits that field comprises. A packet length field 402 contains the overall length of the packet in bits. As suggested by the inclusion of a packet length field 402, the packet length may vary and may even exceed the length of a single block in a given subframe. A public address field 404 contains the public address of the decoder to which the ADP is targeted. As explained above, the decoders 36 provided at every subscriber location contain a unique public address that identifies that decoder, and the subframe demultiplexer (e.g. demultiplexer 268 of FIG. 18) in the decoder examines the public address field 404 of all incoming ADPs and accepts those ADPs that contain the address of that particular decoder. In this manner, therefore, subscriber specific information may be transmitted to individual decoders.

According to another feature of the present invention, each decoder may also be provided with a "group address." The group address may be stored in the decoder at the factory, or alternatively, a decoder may be given a group address via an ADP. In this mode of operation, the first bit of the public address field 404 is used to alert the decoder as to whether the address in the public address field 404 of a received ADP is a unique decoder address or a group address. The subsequent bits in the field 404 will then comprise the actual address. This mode of operation allows groups of decoders to be addressed at the same time.

The public address of a given decoder is set at the factory when the decoder is manufactured. Provision is also made for a plurality of secret serial numbers (SSNs) to be stored in each decoder. These secret serial numbers can be used to encrypt the information carried in an ADP. A secret serial number select field 406 is provided for alerting the decoder as to which SSN in the decoder had been used to encrypt the data in the ADP. A command code field 408 holds a sixteen bit "command" that can be used to control a decoder. The upper six bits of the two byte command code select a given "command set." The remaining ten bits specify the actual command within that command set. A data field 410 provides accompanying data for the command in the command field 408. This arrangement allows for 64 independent command sets with 1024 commands in each set. For example, a "command" may be transmitted in the command field 408 that tells the target decoder to store the information in the data field 410 in a memory at the decoder. A twenty-four bit CRC 412 follows at the end of the ADP 400 to ensure the accuracy of the information contained within the ADP 400. If a decoder detects an error in a given ADP, it discards the entire ADP.

FIG. 22 shows the general arrangement and contents of a system data packet 414 (SDP) that may be transmitted in the transport layer of a subframe. As shown, an SDP 414 comprises a header 416, which identifies the packet as an SDP, and a data field 418. The data field 418 may contain system related information, such as system tuning information, or may carry global seeds. Additionally, if re-configurable decoders are employed, SDPs may carry information concerning the frame rate ($F_{SF}$), block length ($L_B$) and superframe size chosen at the encoder. As can be seen, the SDPs provide a way to send system related information to every decoder in the system; system data packets are received by every decoder.

System related packets, such as SDPs, SSPs, PMCPs, STTs and PVCMPs, must be transmitted each cryptocycle. Because these types of packets may be too numerous to transmit in a single subframe, they are transmitted over one or more of the subframes in a cryptocycle. Thus, cryptocycles define fixed boundaries in a subframe data stream within which a complete set of system related data is transmitted. FIG. 23 illustrates an exemplary cryptocycle. More particularly, FIG. 23 shows the contents of the transport layers of the eight consecutive subframes in the exemplary cryptocycle. In the example shown, the transport layer of each subframe encompasses 13 blocks of the subframe, however, this does not have to be the case. The example shown assumes between 10 and 20 programs are being transmitted in the subframe data stream, and therefore, two program multiplex control packets (PMCPs) are transmitted with every subframe. In subframes 1, 2 and 4–8, the PMCPs are transmitted in blocks 3 and 4 of those subframes, whereas in subframe 3, the PMCPs are transmitted in blocks 11 and 12. Recall that the subframe multiplex map transmitted at the beginning of each subframe specifies the number and location of each of the types of packets transmitted within the transport layer of a given subframe. In the example shown, the program virtual channel map definitions are transmitted with subframes 1 and 2. Service seeds packets are all transmitted in subframe 3. As mentioned, service seeds are transmitted one cryptocycle in advance of the data they were used to encrypt so that the decoder has sufficient time to prepare for decryption. It is desirable therefore to transmit service seed packets as early in a cryptocycle as possible. The remaining blocks of subframes 1 through 8 of the exemplary cryptocycle of FIG. 23 may be used for transmitting various system data packets (SDPs), system teletext packets (STTs) and addressable data packets (ADPs), as shown. Those skilled in the art will appreciate that the type and number of packets transmitted in a given subframe is entirely flexible; the subframe multiplex map can be modified on a per subframe basis to uniquely define the contents of the transport layer of each subframe. It should be noted further that although in the exemplary cryptocycle of FIG. 23 each block of every subframe contains only one transport layer packet, more than one packet may be contained within a single block, if desired. Moreover, transport layer packets are not constrained to fit within a single block, and thus some packets may "wrap" from one block to the next. FIG. 23 shows each block containing a single packet for explanation purposes only.

Figure 24:
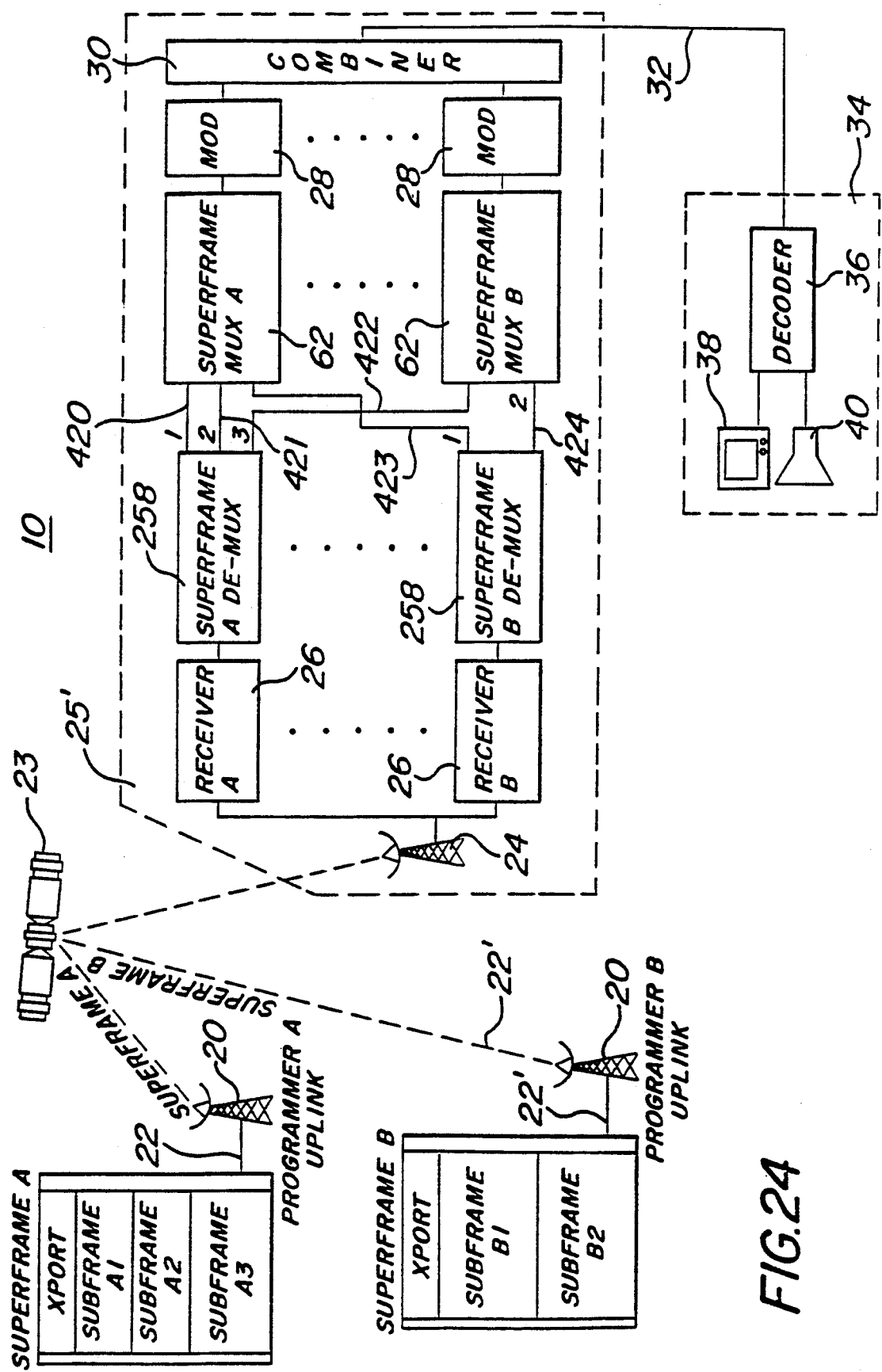
FIG. 24 is a block diagram of an alternate embodiment of the system of the present invention.

FIG. 24 show a block diagram of an alternate embodiment of the system of the present invention as applied to a cable television system. The system 10' is similar to the system 10 except that the cable head-end installation 25' of FIG. 24 differs from the installation 25 of FIG. 1. As shown, in the alternate embodiment, the cable head-end installation comprises a plurality of superframe demultiplexers 258 and superframe multiplexers 62. Each superframe multiplexer 62 may be identical to the superframe multiplexer 62 (FIG. 12) in each encoder 16 (the encoders 16 are not illustrated in FIG. 24 but are assumed to be present). The superframe demultiplexers 258 may be identical to the superframe demultiplexers 258 (FIG. 16) in each decoder 36. In system operation, just as in the system 10 of FIG. 1, a plurality of programmers (e.g., programmers A and B) each generate a multiplex data stream (e.g., streams 22 and 22' respectively) that comprises a continuous sequence of superframes. In the example shown, programmer A is generating a multiplex data stream 22 that comprises a continuous sequence of superframes. As shown, each superframe in multiplex data stream 22 carries, in addition to its transport layer (labeled XPORT), three subframes labeled A1 ... A3. Programmer B is generating multiplex data stream 22' which carries two subframes labeled B1 and B2. Each of the streams 22, 22' is fed to a respective satellite up-link 20 for transmission via satellite 23 to the cable head-end 25'. As explained in connection with the system 10 of FIG. 1, it is understood that there may be many programmers in the system of the present invention, and therefore, a plurality of multiplex data streams may be transmitted via satellite 23 to remote locations such as the cable head-end installation 25'. Moreover, although not shown, multiplex data streams may be received via satellite at locations other than a cable headend, such as, for example, at the locale of a direct broadcast satellite (DBS) subscriber.

A satellite down-link 24 at the cable head-end installation 25' provides each stream 22, 22' to a respective receiver 26 at the cable head-end 25'. So far, therefore, the system 10' operates identically to the system 10 of FIG. 1. Unlike the cable head-end 25 of system 10, however, the cable head-end 25' of system 10' further comprises a plurality of superframe demultiplexers 258 which operate identically to the superframe demultiplexers 258 provided in each decoder 36, the details of which are shown in FIGS. 14 and 16 and describe above. As shown in FIG. 24, each of the received multiplexed data streams is provided to a respective one of the superframe demultiplexers 258. As fully described above, a superframe demultiplexer 258 receives successive superframes of a given multiplex data stream and extracts the individual subframes carried within each successive superframe. As illustrated in FIG. 24, superframe demultiplexer A extracts subframes A1 . .. A3 from each incoming superframe to output, on lines 420, 421 and 422, respectively, subframe data streams A1 to A3. Similarly, superframe demultiplexer B outputs subframe data streams B1 and B2 on lines 423 and 424, respectively. Various subframe data streams may then be routed to the superframe multiplexers 62 provided in the cable head-end 25'. As those skilled in the art will appreciate, subframe data streams are self-sufficient in that the transport layers of each subframe data stream contain all the necessary information needed to extract the individual programs carried within that subframe data stream. A significant advantage of this self-sufficiency is that subframe data streams may be re-transmission multiplexed at the cable head-end in any desired combination using the plurality of superframe multiplexers 62 at the head-end 25'. FIG. 24 illustrates this important feature of the present invention. As shown, for example, subframes A1 and A2 are fed from demultiplexer A to superframe multiplexer 62. However, subframe data stream A3 is fed to superframe multiplexer B. Additionally, subframe data stream B1 is fed to superframe multiplexer A, while subframe data stream B2 is fed to superframe multiplexer B. As shown, therefore, subframe data streams A3 and B1 have been re-routed. Each superframe multiplexer 62 (e.g., multiplexers A and B) may be identical to the superframe multiplexer 62 contained in the encoders 16 of the system, details of which are described above and illustrated in FIG. 12. The output of each superframe multiplexer 62, of course, is a new multiplex data stream containing a continuous sequence of superframes. In the example of FIG. 24, the superframes in the multiplex data stream generated by superframe multiplexer A will carry subframes from subframe data streams A1, A2 and B1, whereas the superframes generated by superframe multiplexer B will carry subframes from subframe data streams A3 and B2. As expected, new subframe virtual channel map packets must be generated in each superframe multiplexer 62 to account for the re-rerouting of subframes. In addition to re-routing of subframe data streams, those skilled in the art will appreciate that subframe data streams may also be generated locally at the cable head-end 25' and fed directly to one of the superframe multiplexers 62 for inclusion in a given multiplex data stream. Although the re-routing of subframe data streams is carried out in FIG. 24 at a cable head-end, those skilled in the art will further appreciate that this technique may be employed at any type of intermediate location in accordance with the particular requirements of a given application of the system and method of the present invention.

From the superframe multiplexers 62 onward, the system 10' again functions identically to the system 10 of FIG. 1. Thus, each multiplex data stream generated by a respective superframe multiplexer 62 is modulated on a unique 6 Mhz cable channel and then fed to a combiner 30 that combines the individual 6 Mhz channels into a single wide-band signal that is transmitted over a cable distribution network 32 to individual subscribers 34.

As the foregoing illustrates, the system and method of the present invention employ a hierarchical framing approach that provides a high degree of flexibility so that the system can easily be adapted to meet the diverse and ever changing demands of various applications. In particular, the system provides both adjustability with respect to program data allocation within the system and adjustability (i.e., scalability) with respect to the overall data transmission rate of the system. In addition the system and method of the present invention provide for easy demultiplexing and re-multiplexing of the individual subframe data streams being transmitted. It will be appreciated by those skilled in the art that changes could be made to the embodiments described above without departing from the broad inventive concepts thereof. It is understood, therefore, that this invention is not limited to the particular embodiments disclosed, but is intended to cover all modifications which are within the scope and spirit of the invention as defined by the appended claims.

What is claimed is:

1. A method of combining a plurality of digital programs into a multiplex data stream for transmitting said programs from an origination point to at least one remote location, wherein each program comprises a single bit stream containing a combination of related digital services, said method comprising the steps of:
    a) multiplexing selected ones of the digital programs to generate a subframe data stream having a format comprising a continuous sequence of subframes different portions of each subframe being allocated to different ones of said digital programs;
    b) generating for each subframe a subframe multiplex map that at least indirectly specifies which portions of that subframe are allocated to which of said selected digital programs, and inserting the subframe multiplex map in the subframe;
    c) repeating step (a) and (b) a selected number of times, each time for different selected ones of said digital programs, thereby generating a plurality of subframe data streams each containing different ones of said digital programs and each comprising a continuous sequence of subframes;
    d) multiplexing selected ones of the subframe data streams to generate said multiplex data stream, said multiplex data stream having a format comprising a continuous sequence of superframes, each superframe containing at least one subframe from at least one of said selected subframe data streams; and
    e) generating, for each superframe in the multiplex data stream, a superframe map that specifies the location of each subframe within that superframe, and inserting the superframe map in that superframe.

2. A method according to claim 1 wherein each subframe has a format comprising a plurality of lines, a first group of lines in each subframe defining a subframe transport layer region and a second group of lines defining a program data region, and wherein step (a) comprises performing the following steps for each subframe:

(i) partitioning the program data region of the subframe into a plurality of program data packets;

(ii) allocating different portions of each program data packet in the subframe to different ones of said programs;

(iii) generating a program multiplex control packet that specifies which portions of each program data packet in the subframe are allocated to which programs; and (iv) inserting the program multiplex control packet in the transport layer region of the subframe, the subframe multiplex map generated in step (b) for that subframe specifying the location of the program multiplex control packet within the transport layer region.

3. A method according to claim 2 wherein each of said programs has a respective data rate, and wherein step (a)(ii) comprises allocating different portions of each program data packet to different ones of said programs in proportion to the respective data rates of said programs.

4. A method according to claim 3 further comprising the step of adjusting, on a per subframe basis, the size of the portions allocated to each program as the respective data rates of the programs change.

5. A method according to claim 2 further comprising the step of:

(a') generating a plurality of system related data packets including system data packets (SDP's), system teletext packets (STT's), addressable data packets (ADP's), service seed packets (SSP's) and program virtual channel map packets (PVCMP's); and (b') inserting selected ones of said system related data packets in the transport layer region of each subframe, the subframe multiplex map generated in step (b) for each subframe specifying the location of each system related data packet inserted within the transport layer region of that subframe.

6. A method according to claim 1 wherein each superframe has a format comprising an adjustable number of successive blocks, a first portion of each block comprising a block synchronization byte (BSYNC), a second portion of each block comprising a data portion, and a last portion of each block comprising a block error code generated in accordance with a block error coding scheme.

7. A method according to claim 6 wherein a first group of blocks in each superframe define a superframe transport layer region of that superframe, and a second group of blocks define a subframe data region, the superframe map generated for each superframe being inserted in the superframe transport layer region of that superframe.

8. A method according to claim 7 wherein each subframe has a format comprising a plurality of lines, and wherein the data portion of each block in the subframe data region of each superframe contains a single line of one of the subframes in that superframe.

9. A method according to claim 6 further comprising the step of inserting, in a first block of each superframe, a superframe synchronization word (FSYNC), and wherein the superframe map for each superframe is inserted in the superframe immediately following the superframe synchronization word.

10. A method according to claim 1 wherein each superframe has a format comprising an adjustable number of successive blocks, a first group of blocks in each superframe defining a superframe transport layer region of that superframe, and a second group of blocks defining a subframe data region, said method further comprising the steps of:

(i) generating a subframe virtual channel map packet that contains information that specifies, for each program, which subframe data stream contains that program; and (ii) periodically inserting the subframe virtual channel map packet in the transport layer region of one of the successive superframes, the superframe map for each superframe into which the subframe virtual channel map is inserted further specifying the location of the subframe virtual channel map packet within the transport layer region of that superframe.

11. A method according to claim 1 further comprising the step of transmitting successive superframes of said multiplex data stream at a constant rate.

12. A method according to claim 6 wherein each block comprises a predetermined number of bits, and wherein said method further comprises the step of transmitting successive superframes of said multiplex data stream at a constant rate such that the multiplex data stream is transmitted at a bit rage equal to $F_{SF}(n)(B)$ bits per second, where $F_{SF}$ is the rate at which successive superframes are transmitted, n is the number of blocks in each superframe, and b is the number of bits in each block.

13. A method of decoding a multiplex data stream of the type recited in claim 1, said method comprising the steps of:

a) receiving the multiplex data stream and selecting one of said programs;

b) determining which subframe data stream contains the selected program;

c) for each successive superframe of the received multiplex data stream, performing the following steps:

(i) extracting the superframe map from the superframe and determining from the extracted superframe map the location of each subframe within that superframe; and (ii) extracting from the superframe the subframe in that superframe that is one of the subframes of the subframe data stream that contains the selected program;

d) for each subframe extracted in step (c)(ii), performing the following steps:

(i) extracting the subframe multiplex map from the subframe and identifying, based at least in-part upon information contained within that multiplex map, which portion of the subframe is allocated to the selected program; and (ii) extracting the identified portion from the subframe; and e) combining the portions extracted from each subframe in step (d)(ii) to reconstruct the selected program.

14. A method according to claim 13 wherein the multiplex data stream contains mapping information that specifies, for each program, which subframe data stream contains that program, and wherein step (b) comprises:

(i) extracting the mapping information from the received multiplex data stream; and (ii) determining from the extracted mapping information which of the subframe data streams contains the selected program.

15. A method according to claim 13 wherein each subframe of each subframe data stream has a format comprising a plurality of successive lines, a first group of lines in each subframe defining a transport layer region of that subframe and a second group of lines defining a program data region, and wherein the program data region of each subframe is partitioned into a plurality of program data packets and different portions of each program data packet are allocated to different ones of said programs, and further wherein the transport layer region of each subframe contains a program multiplex control packet that specifies which portions of each program data packet in that subframe are allocated to which programs and the subframe multiplex map in each subframe specifies the location, within the transport layer region, of the program multiplex control packet for that subframe, and still further wherein step (d) comprises performing the following steps for each subframe:

(i) extracting the subframe multiplex map from the subframe and determining therefrom the location of the program multiplex control packet within the transport layer region of the subframe;

(ii) extracting the located program multiplex control packet from the transport layer region;

(iii) identifying, based upon the extracted program multiplex control packet, which portion of each program data packet of the subframe is allocated to the selected program; and (iv) extracting the portion identified in step (d)(iii) from each of the program data packets in the subframe.

16. An encoder apparatus for combining a plurality of digital programs into a multiplex data stream, wherein each program comprises a single bit stream containing a combination of related digital services, said encoder comprising:

a control computer for controlling the operation of the encoder;

a plurality of subframe multiplexers, each coupled to the control computer and each being coupled to receive a respective group of said programs, each subframe multiplexer being operative to multiplex its respective group of programs to form a subframe data stream having a format comprising a continuous sequence of subframes wherein different portions of each subframe are allocated to different ones of said respective group of programs, each subframe multiplexer being further operative to insert, in each subframe, a subframe multiplex map that specifies, at least indirectly, which portions of each subframe are allocated to which programs; and a superframe multiplexer coupled to each of said subframe multiplexers for receiving said subframe data streams and for multiplexing selected ones of said subframe data streams to generate said multiplex data stream, said multiplex data stream having a format comprising a continuous sequence of superframes, each superframe containing at least one subframe from at least one of said selected subframe data streams, said superframe multiplexer being further operative to generate, for each superframe in the multiplex data stream, a superframe map that specifies the location of each subframe contained in that superframe, and to insert the superframe map in that superframe.

17. An encoder according to claim 16 wherein each subframe has a format comprising a plurality of lines, a first group of lines in each subframe defining a subframe transport layer region and a second group of lines defining a program data region, and wherein each subframe multiplexer comprises:

a subframe controller coupled to the control computer for generating, for each subframe, the subframe multiplex map and at least one program multiplex control packet;

a program multiplexer coupled to the subframe controller and responsive to said program multiplex control packets for multiplexing said respective group of programs in a time-division manner to produce a continuous sequence of program data packets, different portions of each program data packet being allocated to different ones of said group of programs; and a subframe builder coupled to the subframe controller and to said program multiplexer for constructing each subframe in accordance with the subframe multiplex map generated for that subframe, wherein for each subframe, the subframe builder is operative; (i) to insert a number of consecutive program data packets in the program data region of the subframe, (ii) to insert the program multiplex control packet for that subframe in the transport layer region of the subframe at a location specified by the subframe multiplex map for that subframe, and (iii) to insert the subframe multiplex map at a beginning of the subframe.

18. An encoder according to claim 17 wherein, for each program data packet to be inserted in a particular subframe, the program multiplex control packet generated for that subframe by the subframe controller specifies which portions of each program data packet are to be allocated to which programs, and wherein the program multiplexer is responsive to the multiplex control packet for generating each of the program data packets in accordance with the information specified therein.

19. An encoder according to claim 17 wherein the subframe builder is further operative to insert a subframe synchronization word (SFSYNC) in a first line of each subframe and to insert the subframe multiplex map in each frame such that the subframe multiplex map immediately follows the subframe synchronization word (SFSYNC).

20. An encoder according to claim 17 wherein the control computer is further operative to construct a plurality of system related data packets including system data packets (SDP's), system teletext packets (STT's), addressable data packets (ADP's), service seed packets (SSP's) and program virtual channel map packets (PVCMP's), said subframe builder in each subframe multiplexer inserting selected ones of said system related data packets in the transport layer regions of each subframe, the subframe multiplex map generated for each subframe by the subframe controller specifying the number and location of each system related data packet to be inserted in the transport layer region of that subframe.

21. An encoder according to claim 18 wherein each of said digital programs has a respective data rate and wherein said portions of each program data packet are allocated to said programs in proportion to the respective data rates of each program.

22. An encoder according to claim 21 wherein said subframe multiplexer is further operative to adjust, on a per subframe basis, the size of each portion of each program data packet allocated to a particular program as the respective data rates of each program change.

23. An encoder according to claim 16 wherein said superframe multiplexer comprises:
a superframe controller coupled to the control computer for generating said superframe map; and
a superframe builder coupled to the superframe controller and coupled to receive successive subframes from each subframe multiplexer for constructing each superframe in accordance with the superframe map generated by the superframe controller, and for inserting each superframe map in its respective superframe.

24. An encoder according to claim 23 wherein said superframe multiplexer further comprises an interleaver coupled to an output of said superframe builder for interleaving portions of each superframe to reduce burst errors during subsequent transmission of the multiplex data stream to a remote location.

25. An encoder according to claim 23 wherein each superframe has a format comprising an adjustable number of successive blocks, a first group of blocks in each superframe defining a superframe transport layer region of that superframe and a second group of blocks defining a subframe data region, said superframe builder including:
means for inserting a block syncrhonization byte (BSYNC) in a first portion of each block; and
means for inserting a superframe syncrhonization word (FSYNC) in a first block of each superframe.

26. An encoder according to claim 25 wherein the superframe multiplexer further comprises block error coding means for generating a block error code for each block and appending the block error code to the block.

27. An encoder according to claim 23 wherein the control computer is further operative to generate a subframe virtual channel map packet that contains information that specifies, for each program, which subframe data stream contains that program, and wherein the superframe builder of the superframe multiplexer further comprises means for periodically inserting the subframe virtual channel map packet in the transport layer regions of selected superframes, the superframe map for each superframe into which the subframe virtual channel map packet is inserted further specifying the location of the subframe virtual channel map packet within that superframe.

28. A decoder for use at a remote location to decode a multiplex data stream received at that location, said received multiplex data stream containing a multiplexed combination of digital programs and having a format comprising a continuous sequence of superframes each comprising a predetermined number of blocks, a first group of blocks in each superframe defining a transport layer region of that superframe and a second group of blocks defining a subframe data region, the subframe data region of each superframe comprising a multiplexed combination of subframes, different portions of each subframe being allocated to different ones of said digital programs and at least one subframe in each superframe containing data for a different group of said programs than another subframe in that superframe, said decoder comprising:

a receiver for receiving successive superframes of the multiplex data stream;
a selector for selecting at least one of said digital programs for extraction from said received multiplexed data stream;
a superframe demultiplexer comprising:
a superframe map extractor for locating and extracting a superframe map from a received superframe of the received multiplex data stream, said superframe map specifying the location of each subframe contained within that superframe; and
a subframe extractor at least indirectly responsive to the extracted superframe map for identifying which subframe in the received superframe contains data for the selected program and for extracting that subframe from the received superframe; and
a subframe demultiplexer coupled to the superframe demultiplexer for receiving the extracted subframe from the superframe demultiplexer, said subframe demultiplexer comprising:
a subframe multiplex map extractor for extracting a subframe multiplex map from the extracted subframe that specifies, at least indirectly, which portions of the subframe are allocated to which digital programs; and
a program extractor responsive to the extracted subframe multiplex map for identifying, based at least in-part upon information contained in the subframe multiplex map, which portion of the subframe is allocated to the selected program, and for extracting the identified portion from the subframe.

29. A decoder according to claim 28 wherein the multiplex data stream contains mapping information that specifies, for each program, which subframe data stream contains that program, and wherein the superframe demultiplexer further comprises means for extracting the mapping information from the received multiplex data stream and identifying therefrom which subframe in the received superframe contains data for the selected program.

30. A decoder for use at a remote location to decode a multiplex data stream received at that location, said received multiplex data stream containing a multiplexed combination of digital programs and having a format comprising a continuous sequence of superframes each containing a multiplexed combination of subframes, each subframe comprising a transport layer region and a program data region, the program data region of each subframe being partitioned into a plurality of program data packets, different portions of each program data packet being allocated to different ones of said digital programs, at least one subframe in each superframe containing data for a different group of said programs than another subframe in that superframe, the transport layer region of each subframe containing a program multiplex control packet that specifies, for each program data packet within that subframe, which portions of each program data packet are allocated to which programs, the transport layer region of each subframe further containing a subframe multiplex map which specifies, for that subframe, the location of the program multiplex control packet contained in the transport layer region of that subframe, said decoder comprising:
a receiver for receiving successive superframes of the multiplex data stream;

a selector for selecting at least one of said digital programs for extraction from said received multiplexed data stream;

a superframe demultiplexer comprising:

a superframe map extractor for locating and extracting a superframe map from a received superframe of the received multiplex data stream, said superframe map specifying the location of each subframe contained within that superframe; and a subframe extractor at least indirectly responsive to the extracted superframe map for identifying which subframe in the received superframe contains data for the selected program and for extracting that subframe from the received superframe; and a subframe demultiplexer coupled to the superframe demultiplexer for receiving the extracted subframe from the superframe demultiplexer, said subframe demultiplexer comprising:

a subframe multiplex map extractor for extracting the subframe multiplex map from the received subframe and for identifying therefrom the location of the program multiplex control packet within the transport layer region of that subframe;

means for extracting the program multiplex control packet from the transport layer region of the received subframe; and a program extractor responsive to the extracted program multiplex control packet for identifying, based upon information contained in the extracted program multiplex control packet, which portion of each program data packet in the received subframe is allocated to the selected program, and for extracting the identified portion from each program data packet.

31. A decoder according to claim 30 wherein the multiplex data stream contains mapping information that specifies, for each program, which subframe data stream contains that program, and wherein the superframe demultiplexer further comprises means for extracting the mapping information from the received multiplex data stream and identifying therefrom which subframe in the received superframe contains data for the selected program.

32. A method comprising the steps of:
a) receiving a plurality of multiplex data streams, each multiplex data stream containing a multiplexed combination of subframe data streams wherein each subframe data stream comprises a continuous sequence of subframes, said received multiplex data streams each having a format comprising a continuous sequence of superframes, each superframe in a particular multiplex data stream containing at least one subframe from at least one of the subframe data streams contained in that multiplex data stream and each superframe further containing a superframe map that specifies the location of each subframe within that superframe;
b) for each received multiplex data stream, demultiplexing and separating the subframe data streams contained in that multiplex data stream and providing each subframe data stream in a separate channel;
c) selecting a plurality of said demultiplexed and separated subframe data streams, at least one of said selected subframe data streams having been demultiplexed and separated from a different multiplex data stream than others of said selected subframe data streams;
d) multiplexing said selected subframe data streams to generate a new multiplex data stream having a format comprising a continuous sequence of superframes wherein each superframe comprises at least one subframe from at least one of said selected subframe data streams;
e) generating, for each superframe in the new multiplex data stream, a superframe map that specifies the location of each subframe within that superframe, and inserting the superframe map in that superframe; and
f) transmitting the new multiplex data stream to at least one reception site.

33. A method according to claim 32 wherein for each received multiplex data stream step (b) comprises:
(i) for each successive superframe of the received multiplex data stream, extracting the superframe map from the superframe, and based upon information contained therein, locating, extracting and separating the subframes contained in that superframe; and
(ii) combining each subframe extracted from a particular superframe with corresponding subframes extracted from previous superframes to reproduce each subframe data stream and provide each subframe data stream on a separate channel.

34. A method according to claim 32 wherein each superframe of said new multiplex data stream and each of said received multiplex data streams has a format comprising an adjustable number of successive blocks, a first portion of each block comprising a block synchronization byte (BSYNC), a second portion of each block comprising a data portion, and a last portion of each block comprising a block error code generated in accordance with a block error coding scheme.

35. A method according to claim 32 wherein a first group of blocks in each superframe of the new multiplex data stream define a superframe transport layer region of that superframe, and a second group of blocks define a subframe data region, the superframe map generated in step (c) for each superframe of the new multiplex data stream being inserted in the superframe transport layer region of that superframe.

36. A method according to claim 32 further comprising the step of inserting, in a first block of each superframe of the new multiplex data stream a superframe synchronization word (FSYNC), and wherein step (e) comprises inserting the superframe map for each superframe at a location immediately following the superframe synchronization word.

37. A method according to claim 32 wherein step (f) comprises transmitting successive superframes of said new multiplex data stream at a constant rate.

38. A method according to claim 34 wherein each block comprises a predetermined number of bits, and wherein step (f) comprises transmitting successive superframes of said new multiplex data stream at a constant rate such that the new multiplex data stream is transmitted at a bit rate equal to $F_{SF}(n)(B)$ bits per second, where $F_{SF}$ is the rate at which successive superframes are transmitted, n is the number of blocks in each superframe, and B is the number of bits in each block.

39. A headend installation comprising:
a plurality of receivers each tuned to receive a different one of a plurality of multiplex data streams transmitted from at least one encoder site, each multiplex data stream containing a multiplexed combination of subframe data streams wherein each subframe data stream comprises a continuous sequence of subframes, said received multiplex data streams each having a format comprising a continuous sequence of superframes, each superframe in a particular multiplex data stream containing at least one subframe from at least one of the subframe data streams contained in that multiplex data stream and each superframe further containing a superframe map that specifies the location of each subframe within that superframe;

a plurality of superframe demultiplexers each coupled to a respective one of said receivers for demultiplexing and separating the subframe data streams contained in the multiplex data streams received by that receiver and for providing each of the separated subframe data stream on a separate channel;

re-routing means for selecting a plurality of said demultiplexed and separated subframe data streams, at least one of said selected subframe data streams having been demultiplexed and separated from a different multiplex data stream than others of said selected subframe data streams; and a superframe multiplexer coupled to receive each of said selected subframe data streams for multiplexing said selected subframe data streams to generate a new multiplex data stream, said new multiplex data stream having a format comprising a continuous sequence of superframes, each superframe containing at least one subframe from each of said selected subframe data streams, said superframe multiplexer being further operative to generate, for each superframe in the multiplex data stream, a superframe map that specifies the location of each subframe contained in that superframe, and to insert the superframe map in that superframe.

40. A headend installation according to claim 39 wherein said superframe multiplexer comprises:
a superframe controller for generating the superframe map for each superframe; and
a superframe builder coupled to the superframe controller and coupled to receive successive subframes from each subframe multiplexer for constructing each superframe in accordance with the superframe map generated by the superframe controller, and for inserting each superframe map in its respective superframe.

41. A headend installation according to claim 40 wherein said superframe multiplexer further comprises an interleaver coupled to an output of said superframe builder for interleaving portions of each superframe to reduce burst errors during subsequent transmission of the multiplex data stream to a remote location.

42. A headend installation according to claim 40 wherein each superframe of the new multiplex data stream has a format comprising an adjustable number of successive blocks, a first group of blocks in each superframe defining a superframe transport layer region of that superframe and a second group of block defining a subframe data region, said superframe builder including:
means for inserting a block synchronization byte (BSYNC) in a first portion of each block; and
means for inserting a superframe synchronization word (FSYNC) in a first block of each superframe.

43. A headend installation according to claim 42 wherein the superframe multiplexer further comprises block error coding means for generating a block error code for each block and appending the block error code to the block.

44. A headend installation according to claim 39 further comprising a transmitter coupled to said superframe multiplexer for transmitting successive superframes of said new multiplex data stream at a constant rate.

45. A headend installation according to claim 42 wherein each block comprises a predetermined number of bits, and wherein said headend installation further comprises a transmitter coupled to said superframe multiplexer for transmitting successive superframes of said new multiplex data stream at a constant rate such that the multiplex data stream is transmitted at a bit rate equal to $F_{SF}(n)(B)$ bits per second, where $F_{SF}$ is the rate at which successive superframes are transmitted, n is the number of blocks in each superframe, and B is the number of bits in each block.

46. A headend installation according to claim 39 wherein each superframe demultiplexer comprises:
a superframe map extractor for locating and extracting a superframe map from a superframe of the received multiplex data stream, said superframe map specifying the location of each subframe contained within that superframe;
a subframe extractor coupled to the superframe map extractor and at least indirectly responsive to the extracted superframe map for determining the location of each subframe within the superframe and for extracting and separating each subframe from the superframe.

47. A digital data stream containing a multiplexed combination of digital programs wherein each program comprises a combination of related digital services, said data stream comprising a continuous sequence of superframes,
each superframe containing a plurality of subframes, and each superframe containing a superframe map that specifies for that superframe the location of each of the subframes in that superframe,
each subframe in each superframe containing a multiplexed combination of data from a subset of said digital programs wherein different portions of each subframe are allocated to different ones of said programs of said subset, at least one of the subframes in a particular superframe containing a multiplexed combination of digital programs from a different subset than another subframe in that superframe, each subframe further containing a subframe multiplex map that at least indirectly specifies which portions of that subframe are allocated to which programs of said subset.

48. A digital data stream according to claim 47 wherein each subframe in each superframe has a format comprising a plurality of lines, a first group of lines in each subframe defining a subframe transport layer region and a second group of lines defining a program data region, the program data region of each subframe being portioned into a plurality of program data packets, and wherein different portions of each program data packet in each subframe are allocated to different ones of the programs of said subset.

49. A digital data stream according to claim 48 wherein the transport layer region of each subframe in each superframe contains a program multiplex control packet that specifies which portions of each program data packet in that subframe are allocated to which programs of said subset.

50. A digital data stream according to claim 48 wherein each of said digital programs has a respective data rate, and wherein different portions of each program data packet in each subframe are allocated to different ones of said programs of said subset in proportion to the respective data rates of said programs of said subset.

51. A digital data stream according to claim 48 wherein the transport layer region of each subframe in each superframe contains a plurality of system related data packets including system data packets (SDP's), system teletext packets (STT's), addressable data packets (ADP's), service seed packets (SSP's) and program virtual channel map packets (PVCMP's), and wherein the subframe multiplex map in each subframe specifies the location of each system related data packet in the transport layer region of that subframe.

52. A digital data stream according to claim 47 wherein each superframe has a format comprising an adjustable number of successive blocks, a first portion of each block comprising a block synchronization byte (BSYNC), a second portion of each block comprising a data portion, and a last portion of each block comprising a block error code generated in accordance with a block error coding scheme.

53. A digital data stream according to claim 52 wherein a first group of blocks in each superframe define a superframe transport layer region of that superframe, and a second group of blocks define a subframe data region, the superframe map of each superframe being located in the superframe transport layer region of said each superframe.

54. A digital data stream according to claim 53 wherein each subframe has a format comprising a plurality of lines, and wherein the data portion of each block in the subframe data region of each superframe contains a single line of one of the subframes in that superframe.

55. A digital data stream according to claim 52 wherein a first block of each superframe contains a superframe synchronization word (FSYNC), and wherein the superframe map for each superframe is located in the superframe immediately following the superframe synchronization word.

* * * * *